US012786579B2

(12) United States Patent
Bahukhandi et al.

(10) Patent No.: US 12,786,579 B2
(45) Date of Patent: Nov. 3, 2026

(54) FOVEATED SENSOR READOUT

(71) Applicant: Apple Inc., Cupertino, CA (US)

(72) Inventors: Ashirwad Bahukhandi, Los Gatos, CA (US); Andrew K. Mcmahon, Redwood City, CA (US); Luke A. Pillans, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/887,024

(22) Filed: Sep. 16, 2024

(65) Prior Publication Data

US 2025/0350856 A1 Nov. 13, 2025

Related U.S. Application Data

(60) Provisional application No. 63/644,498, filed on May 8, 2024.

(51) Int. Cl.

*H04N 25/46* (2023.01)
*H04N 25/13* (2023.01)
*H04N 25/42* (2023.01)
*H04N 25/443* (2023.01)
*H04N 25/447* (2023.01)
*H04N 25/702* (2023.01)
*H04N 25/78* (2023.01)

(52) U.S. Cl.

CPC ............. *H04N 25/46* (2023.01); *H04N 25/13* (2023.01); *H04N 25/702* (2023.01)

(58) Field of Classification Search

CPC ...... H04N 25/46; H04N 25/702; H04N 25/13; H04N 25/42; H04N 25/134; H04N 25/443; H04N 25/447; H04N 25/78

See application file for complete search history.

(56) References Cited

U.S. PATENT DOCUMENTS

| | | | | |
|---|---|---|---|---|
| 8,822,899 | B2 * | 9/2014 | Cho ....................... | H04N 25/46 250/208.1 |
| 11,190,714 | B2 | 11/2021 | Nakata | |
| 12,057,089 | B2 | 8/2024 | Hazra et al. | |
| 2010/0283843 | A1 | 11/2010 | Cai | |
| 2013/0070109 | A1 | 3/2013 | Gove et al. | |
| 2017/0287112 | A1 | 10/2017 | Stafford et al. | |
| 2018/0220068 | A1 | 8/2018 | Guenter | |
| 2019/0331919 | A1 | 10/2019 | Huo | |
| 2019/0355332 | A1 | 11/2019 | Knez et al. | |

(Continued)

FOREIGN PATENT DOCUMENTS

| | | | |
|---|---|---|---|
| EP | 1102323 | A1 | 5/2001 |
| EP | 1467410 | A2 | 10/2004 |

(Continued)

OTHER PUBLICATIONS

International Search Report and Written Opinion from PCT/US2025/024789, dated Jul. 1, 2025, 17 pages.

(Continued)

*Primary Examiner* — Marly S Camargo

(74) *Attorney, Agent, or Firm* — BAKERHOSTETLER

(57) ABSTRACT

Aspects of the subject technology relate to foveated sensor readout. Foveated sensor readout may include binning, within a pixel array of an image sensor and based on a region-of-interest (ROI) indicator, a subset of the sensor pixels of the pixel array.

20 Claims, 15 Drawing Sheets

(56) References Cited

U.S. PATENT DOCUMENTS

| | | | |
|---|---|---|---|
| 2020/0060396 A1 | 2/2020 | Ma | |
| 2020/0326777 A1 | 10/2020 | Shoushtari et al. | |
| 2021/0081040 A1 | 3/2021 | Sengelaub | |
| 2021/0166341 A1 | 6/2021 | Bastani et al. | |
| 2022/0201236 A1 | 6/2022 | Gao et al. | |
| 2023/0156353 A1* | 5/2023 | Jang ..................... | G06V 10/761 |
| 2023/0300285 A1 | 9/2023 | Raghunath et al. | |
| 2024/0007771 A1 | 1/2024 | Berkovich et al. | |
| 2024/0029210 A1 | 1/2024 | Pope | |
| 2024/0114266 A1 | 4/2024 | Yang | |
| 2024/0267627 A1 | 8/2024 | Katz et al. | |

FOREIGN PATENT DOCUMENTS

| | | |
|---|---|---|
| KR | 2022-0020899 | 2/2022 |
| WO | WO 2023/163799 A1 | 8/2023 |

OTHER PUBLICATIONS

European Patent Application No. 253713001.8, Examination Report dated Feb. 20, 2026, 6 pages.
Korean Patent Application No. 10-2024-7031006, Office Action dated Mar. 26, 2026, 12 pages, with English translation.
Korean Patent Application No. 10-2024-7031006, Office Action dated Aug. 14, 2026, 13 pages, with English translation.

* cited by examiner

FOVEATED SENSOR READOUT

CROSS REFERENCE TO RELATED APPLICATIONS

This application claims the benefit of priority to U.S. Provisional Patent Application No. 63/644,498, entitled, "Foveated Sensor Readout", filed on May 8, 2024, the disclosure of which is hereby incorporated herein in its entirety.

TECHNICAL FIELD

The present description relates generally to electronic sensors, including, for example, to foveated sensor readout.

BACKGROUND

Electronic devices often include cameras. Typical camera readout operations include global shutter operations and rolling shutter operations that read out all pixels of the camera for each image frame.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
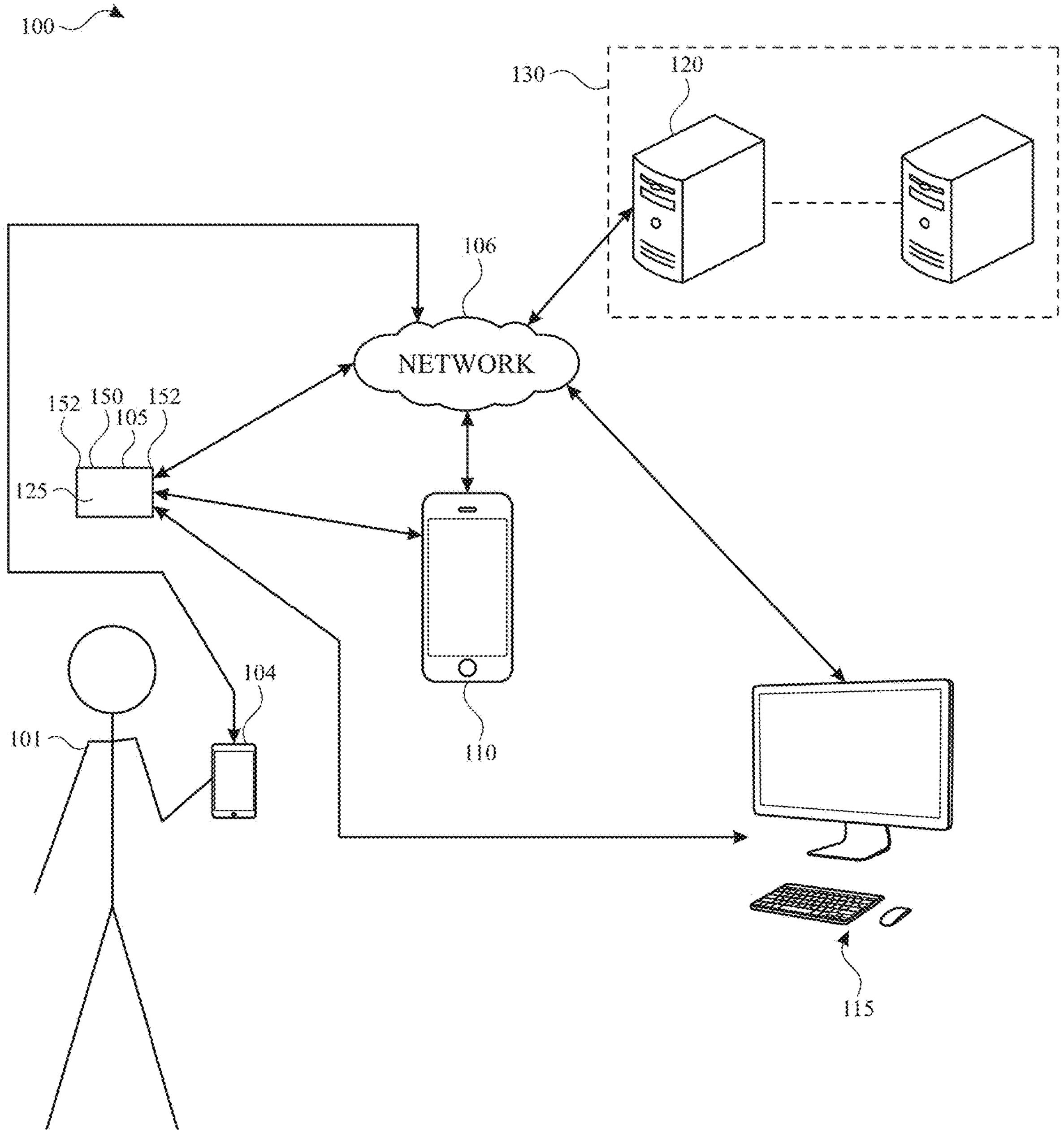
FIG. 1 illustrates an example system architecture including various electronic devices that may implement the subject technology in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein may provide foveated image sensor readout. For example, devices that provide XR experiences often use foveated rendering of display frames, in which a displayed frame has a reduced resolution pattern that is based on a user's current gaze location, for display efficiency. Some XR experiences, such as AR and/or MR experiences, often include a pass-through video view of a user's physical environment. For example, the pass-through video view may be captured using one or more image sensors of a device. The image frames captured by the image sensors may be full-resolution image frames that can be later foveated, at display time, for display efficiency.

In accordance with aspects of the subject technology, implementing foveation at the image sensor (e.g., foveated sensor readout), where and when the image frames are captured, can provide additional sensing, readout, and/or power efficiencies. In various implementations, foveated sensor readout can include (e.g., based on a gaze location of a user or some other indication of a region-of-interest (ROI) within an image frame), binning of some of the pixel values within a pixel array (e.g., prior to readout), and/or binning of analog pixel values by analog-to-digital (ADC) readout circuitry of an image sensor. In one or more implementations, further analog and/or digital binning based on the ROI may also be performed. In one or more implementations, foveated sensor readout may be based on the ROI and a type of a color filter array of the image sensor.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smartphone, a tablet device, or a wearable device such as a head mountable portable system, that includes a display system capable of presenting a visualization of an extended reality environment or other display environment to a user (e.g., user 101). The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150. Camera(s) 150 may include visible light cameras, infrared cameras, eye tracking cameras, etc. Each camera 150 may include one or more image sensors, each image sensor including an array of sensor pixels (e.g., image sensor pixel) and readout circuitry for reading out the sensor pixels of the array (e.g., in a global shutter or rolling shutter operation). For example, an array of sensor pixels may include sensor pixels arranged in rows and columns.

Further, the electronic device 105 may include various other sensors such as sensor(s) 152 including, but not limited to, touch sensors, microphones, inertial measurement units (IMU), heart rate sensors, temperature sensors, Lidar sensors, radar sensors, depth sensors, sonar sensors, GPS sensors, Wi-Fi sensors, near-field communications sensors, etc. One or more of the sensors 152 may also include an array of sensor pixels (e.g., depth sensor pixels, Lidar sensor pixels, radar sensor pixels, or other sensor pixels other than image sensor pixels).

The electronic device 105 may include hardware elements that can receive user input such as hardware buttons or switches. User input detected by such sensors and/or hardware elements correspond to various input modalities. For example, such input modalities may include, but not limited to, facial tracking, eye tracking (e.g., gaze direction or gaze location tracking), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 and/or providing power to the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to coordinate the rendering of virtual content, such as a UI of an application, for display within the XR environment.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The handheld electronic device 104 may be, for example, a smartphone, a portable computing device such as a laptop computer, a companion device (e.g., a digital camera, headphones), a tablet device, a wearable device such as a watch, a band, and the like, or any other appropriate device that includes, for example, one or more speakers, communications circuitry, processing circuitry, memory, a touchscreen, and/or a touchpad. In one or more implementations, the handheld electronic device 104 may not include a touchscreen but may support touchscreen-like gestures, such as in an extended reality environment.

The electronic device 110 may be, for example, a smartphone, a portable computing device such as a laptop computer, a companion device (e.g., a digital camera, headphones), a tablet device, a wearable device such as a watch, a band, and the like, or any other appropriate device that includes, for example, one or more speakers, communications circuitry, processing circuitry, memory, a touchscreen, and/or a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a tablet device. In one or more implementations, the electronic device 110, the handheld electronic device 104, and/or the electronic device 105 may be, and/or may include all or part of, the electronic system discussed below with respect to FIG. 20. In one or more implementations, the electronic device 110 may be another device such as an Internet Protocol (IP) camera, a tablet, or a companion device such as an electronic stylus, etc.

The electronic device 115 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 20.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
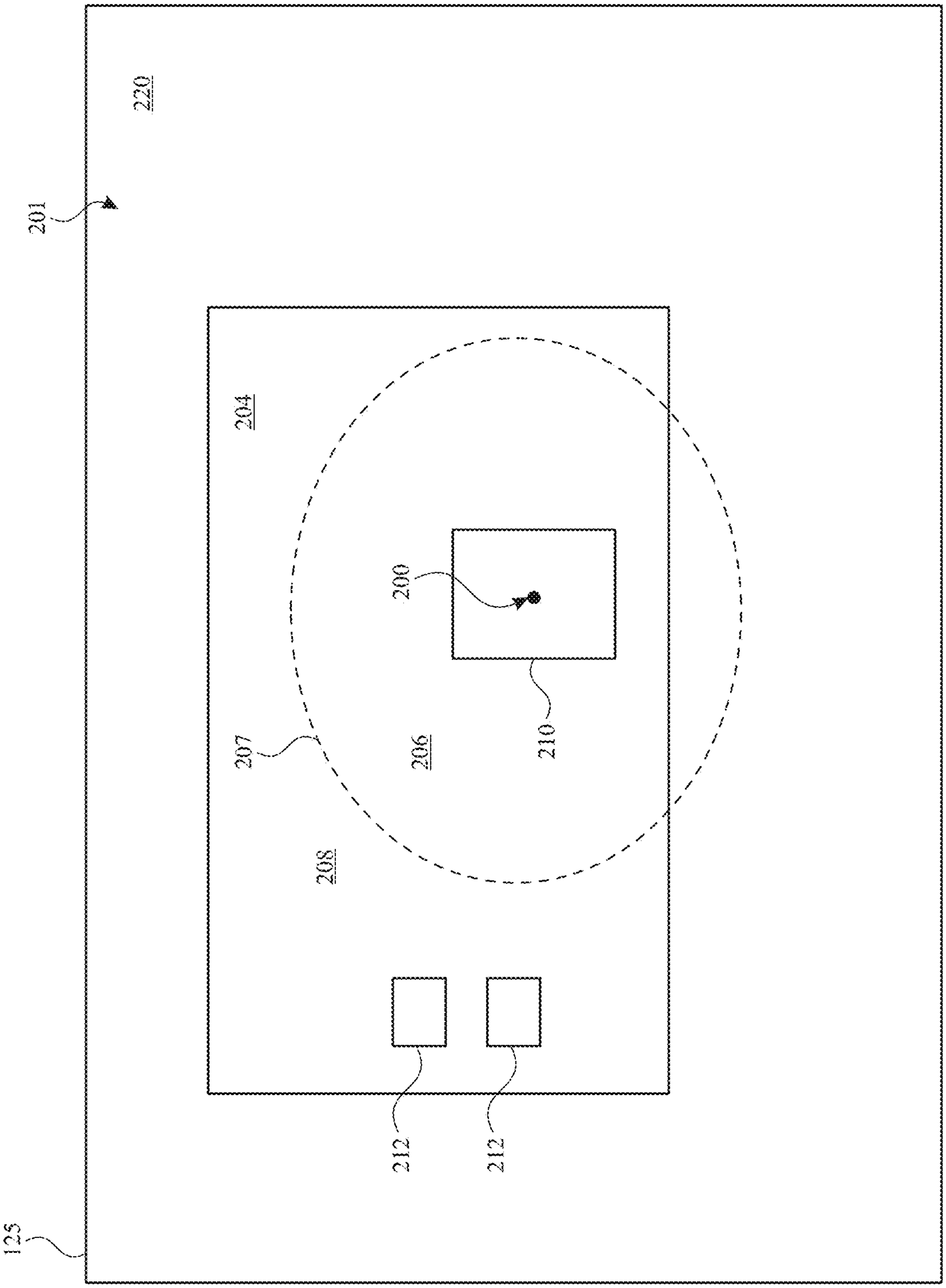
FIG. 2 illustrates example of display content that may be displayed by a display of an electronic device in accordance with one or more implementations.

FIG. 2 illustrates an example use case in which the display 125 displays a foveated display frame. In this example, the display 125 displays a user interface (UI) 204 (e.g., of an application or an operating system process running on the electronic device 105). In the example of FIG. 2, the UI 204 is overlaid on a view 220 of a physical environment of the electronic device 105. For example, the UI 204 may be displayed to appear, to a viewer of the display 125 (e.g., a user of the electronic device 105) as though the UI 204 is at a location, remote from the display 125, within the physical environment. In the example of FIG. 2, UI 204 includes a UI element 210 and UI elements 212. UI elements 210 and 212 may correspond to, as illustrative examples, a sub-window of a UI window, static elements such as images, dynamic elements such as video streams and/or virtual characters, and/or other interactive of non-interactive virtual content.

In the example of FIG. 2, a user (e.g., user 101 of FIG. 1) of the electronic device 105 is gazing at a gaze location 200 on display 125. For example, using one or more of the camera(s) 150 and/or sensor(s) 152 (e.g., using images of the user's eyes), the gaze location 200 may be determined (e.g., in terms of the coordinates of a pixel or group of pixels of the display 125 and/or a gaze location in three-dimensional space). In this example use case of FIG. 2, the gaze location 200 is within the boundary of the UI element 210.

In the example of FIG. 2, a display frame 201 that is displayed on the display 125 is a foveated display frame in which a first portion 206 of the display frame that is within a predefined distance from the gaze location 200 (e.g., within a boundary 207) is displayed with a first resolution, and a second portion 208 of the display frame that is outside the predefined distance (e.g., outside the boundary 207) is displayed with a second, lower resolution. In this way, foveation of display frames can save power and/or processing resources of the device, by allowing pixels in the second portion 208 to be rendered at a lower resolution (e.g., a single display pixel value may be rendered and then displayed by multiple physical display pixels), when the user is not gazing on that portion of the display. For explanatory purposes, foveation is described herein with reference to the resolution of the content; however, the foveation may also be applicable to bit rate, compression, or any other encoding aspect/feature of the content. In the example of FIG. 2, the foveation is performed around a region-of-interest ROI that is determined by the gaze location 200. However, it is appreciated that the ROI that defines the first portion 206 (e.g., the high resolution portion) may be identified based on information other than the user's gaze. For example, an ROI may be indicated by a field-of-view (FoV) of a camera in a multi-camera system. For example, a foveated image frame may be generated by and/or for a device in which a field-of-view (FoV) of one camera (e.g., with a narrow FoV) determines the ROI for high resolution within a broader FOV of another camera (e.g., a wider FoV camera). As another example, a ROI indicator may be a user input indicating a zoom level or zoom region, or a view-finder region (e.g., any region outside of the intended zoom region or view-finder region may be readout as low resolution binned data).

In the example of FIG. 2, the boundary 207 is indicated by a dashed line. However, this is merely for ease of understanding and it is appreciated that the boundary 207 between the first portion 206 (e.g., the high resolution portion) and the second portion (e.g., the low resolution portion) of the display frame may be not be displayed, and may be constructed so as to be imperceptible by the user. Moreover, the boundary 207 of FIG. 2 is depicted as a rounded boundary, but may be implemented with other forms and/or shapes (e.g., a rectilinear shape, such as a symmetric rectilinear shape or an asymmetric rectilinear shape) in various implementations.

Further, the resolution of the first portion 206 and/or the resolution of the second portion 208 may also be varied as a function of distance from the gaze location 200 (or other ROI indicator) and/or as a function of the displayed content. Further, although the foveated display frame of FIG. 2 includes the first portion 206 and the second portion 208 having first and second respective resolutions, a foveated display frame may have any number of regions and/or subregions (e.g., also referred to herein as regions of interest (ROIs)) with different resolutions, and/or any number of boundaries therebetween. Further, in the example of FIG. 2, a single UI 204 is displayed over the view 220 of the physical environment. However, it is appreciated that, in one or more use cases, the UI 204 may be displayed at a first location on the display (e.g., a first portion of a foveated display frame) while other display content (e.g., system content and/or display content from one or more other applications) is concurrently displayed at other locations on the display (e.g., other locations within the foveated display frame).

In the example of FIG. 2, both the first portion 206 and the second portion 208 of a displayed foveated display frame include part of the UI 204 and part of the view 220 of the physical environment. In one or more implementations, because the UI 204 includes computer-generated content, the UI 204 may be foveated, according to the portions 206 and 208 for a current gaze location 200 (or other ROI indicator), when the UI 204 is generated and/or rendered by the device. The view 220 of the physical environment may be provided on the display 125 by displaying a series of image frames captured by one or more of the camera(s) 150 (e.g., in a pass-through video view of the physical environment). In one or more implementations, the foveated view of the physical environment may be generated by reducing the resolution of a portion, corresponding to the second portion 208, of a full-resolution image frame captured by a camera 150.

However, as discussed herein, there may be benefits to performing the foveation of the image frames, for the view 220, earlier in processing pipeline from image capture (e.g., at an image sensor) to display (e.g., on the display 125). As examples, foveation may be performed at the image sensor itself by reading out only a subset of the sensor pixels of a pixel array of the image sensor, by binning of pixel values within the pixel array (e.g., prior to readout of the sensor pixels), and/or binning of analog pixel values by analog-to-digital (ADC) readout circuitry.

As examples, foveated readout of a pixel array may result in fewer pixels to readout, may provide an opportunity to increase the resolution of some portions of an image frame within the same power budget or to lower the sensor, SoC, and/or system power usage for the same resolution, may increase readout speed (e.g., which may reduce rolling shutter artifacts and/or increase the frame rate), may result in fewer pixels to process by later stages in the pipeline to display (e.g., by an SoC on which the image sensor is disposed or a separate SoC of a device), may the lower link rate for interface between sensor and a host (e.g., the SoC), and/or reduce electromagnetic interference (EMI).

Figure 3:
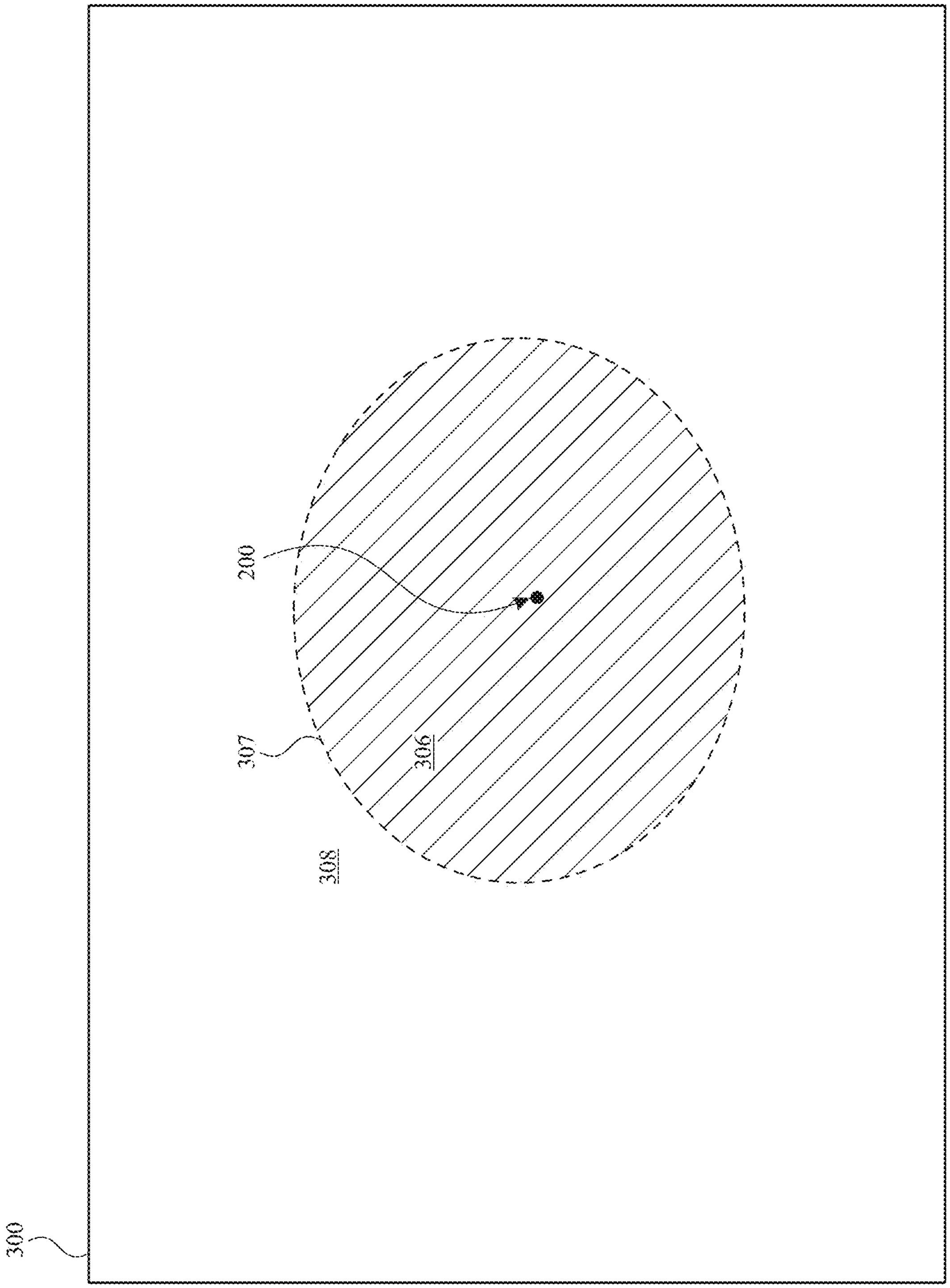
FIG. 3 illustrates an example of a foveated image frame that can be generated from a foveated sensor readout in accordance with one or more implementations.

FIG. 3 illustrates an example of a foveated image frame 300 that may be provided from an image sensor a camera, such as a camera 150 of the electronic device 105. In the example of FIG. 3, an image frame 300 has been generated based on the gaze location 200 of FIG. 2. However, this is merely illustrative and, in other implementations, the image frame 300 may be generated with a foveation that is based on an ROI indicator other than the gaze location 200. In this example of FIG. 3, the image frame 300 is a foveated image frame that has a first portion 306 spatially corresponding to the first portion 206 of the display frame of FIG. 2 and a second portion 308 spatially corresponding to the second portion 208 of the display frame of FIG. 2, and separated by a boundary 307, spatially corresponding to the boundary 207 of FIG. 2.

For example, the image frame 300 may have a number of sensor pixels that is equal to the number of sensor pixels in a pixel array of an image sensor that captured the image frame. However, the second portion 308 may include repeated values of only a subset of the sensor pixels of the pixel array that are located in a portion of the pixel array corresponding to the second portion 308. For example, in order to generate the image frame 300, a subset of the sensor pixels of the pixel array may be read out, and then repeated to form the image frame 300. Reading out the subset of the sensor pixels may include skipping readout of some of the sensor pixels, may include binning two or more of the sensor pixels within the pixel array prior to readout, and/or binning pixel values during analog-to-digital conversion by the image sensor.

In the examples of FIGS. 2 and 3, a single ROI indicator (e.g., gaze location 200) is shown. However, it is appreciated that, as an ROI indicator, such as the gaze location 200, moves (e.g., when the user moves their eyes and/or changes their focus), the electronic device 105 may track and update the locations and/or shapes of the first portion 206 and the second portion 208 of the display frames, and/or the first portion 306 and the second portion 308 of the image frames (e.g., by tracking and updating the locations and/or shapes of the corresponding portions of a sensor pixel array), to continue to be substantially centered on the ROI indicator (e.g., the gaze location 200).

Figure 4:
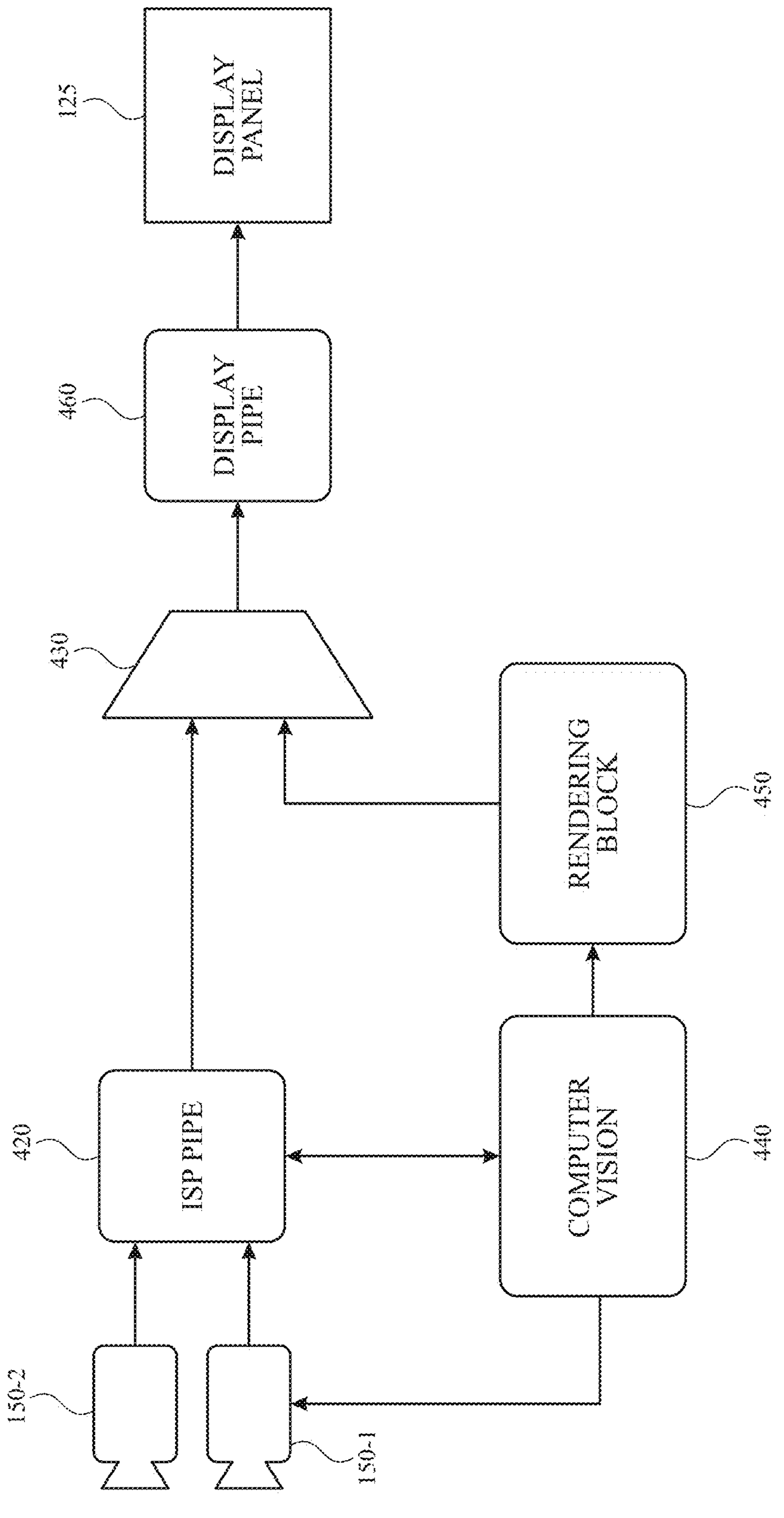
FIG. 4 illustrates a block diagram illustrating a flow of data between components of an electronic device configured to present an extended reality experience using foveated sensor readout according to aspects of the subject technology.

FIG. 4 is a block diagram illustrating an exemplary flow of data between components of an electronic device configured to present an XR experience according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 4, the electronic device may include multiple cameras 150 (e.g., a camera 150-1 and a camera 150-2), an image signal processing (ISP) pipe 420, a blending block 430, computer vision processes 440, a rendering block 450, a display pipe 460, and display 125 (e.g., a display panel including an array of display pixels). In one or more implementations, the camera 150-1 may include a forward-facing camera that is oriented to face in the same direction as a user of the electronic device is expected to be facing. Images from the camera 150-1 may be used to generate the view 220 of physical environment in which the electronic device (e.g., and a user thereof) is present. Cameras 150-1 and 150-2 may be each configured to provide a stream of image frames at a fixed or configurable frame rate. In one or more implementations, the camera 150-2 may be an eye-facing camera configured to capture images of one or both eyes of a user of the electronic device 105.

ISP pipe 420 represents hardware, or a combination of hardware and software, configured to process image frames from camera 150 and provide the image frames to blending block 430. In one or more implementations, operations of the ISP pipe 420 may be performed by a processor that is separate from the cameras 150 (e.g., on a separate chip or system-on-chip). In one or more other implementations, some or all of the operations of the ISP pipe 420 may be performed by a processor that is formed within a camera 150, such as on an SoC on which an image sensor is also disposed.

ISP pipe 420 may also be configured to provide the image frames to computer vision processes 440. Computer vision processes 440 represent software, hardware, or a combination of software and hardware configured to process image frames for computer vision tasks such as determining scene geometry, object identification, object tracking, etc. Computer vision processes 440 also may provide the functionality of a gaze tracker or other ROI tracker. In one or more implementations, a gaze location (e.g., and/or sensor region information based on the gaze location or another ROI indicator) may be provided from the computer vision processes 440 to the camera 150-1 and/or the ISP pipe 420 for use in performing foveated readout operations. For example, images from the camera 150-2 may be used to determine the gaze location 200 of FIGS. 2 and 3. As discussed in further detail herein, the camera 150 and/or the ISP pipe 420 may be configured to downscale the resolution of one or more portions of the image frames from camera 150 using foveated readout operations, such as based on an ROI indicator (e.g., a gaze location, such as gaze location 200 of FIGS. 2 and 3).

Rendering block 450 represents software, hardware, or a combination of software and hardware configured to render virtual content for presentation in the XR experience. Rendering block 450 may be configured to provide frames of virtual content to blending block 430. Blending block 430 represents software, hardware, or a combination of software and hardware configured to blend the frames of virtual content received from rendering block 450 with the image frames (e.g., foveated image frames, such as image frame 300 of FIG. 3) of the physical environment provided to blending block 430 by ISP pipe 420. Blending may include overlaying the rendered virtual content on the image frames of the physical environment, as described herein in connection with FIG. 2. The position, size, and orientation of the rendered virtual content may be rendered by rendering block 450 based on scene information determined by computer vision processes 440. Display pipe 460 represents hardware, or a combination of hardware and software, configured to receive the blended frames from blending block 430 and provide the blended frame data to display 125 for presentation of the XR environment to the user of the electronic device.

Camera 150-1 and camera 150-2 may each represent multiple cameras in one or more implementations. For example, camera 150-1 may represent multiple cameras configured to capture image frames of the physical environment for presentation on multiple respective display panels of the display 125. For example, one camera may be configured to capture image frames for presentation on a display panel arranged to display XR content to one of a user's eyes, and a second camera may be configured to capture image frames for presentation on a second display panel arranged to display XR content to the other eye of the user. As another example, camera 150-2 may represent multiple cameras configured to capture image frames of the eyes of the user for gaze tracking. For example, one eye camera may be configured to capture image frames including one of the user's eyes, and a second eye camera may be configured to capture image frames including the other eye of the user. There also may be multiple instances of the components in the pipeline between cameras 150 and display 125 described above for generation of the respective XR frames presented on the respective display panels.

In one or more implementations, computer vision processes 440 may determine a gaze location (e.g., based on one or more images from camera(s) 150-2) or other ROI indicator, and may provide the gaze location or other ROI indicator to the ISP pipe 420 and/or to the camera(s) 150-1. The camera(s) 150-1 and/or the ISP pipe 420 may determine binning information (e.g., one or more sensor regions for readout with one or more respective resolutions) based on the gaze location or other ROI indicator. In one or more other implementations, computer vision processes 440 and/or one or more other processing blocks at the electronic device 105 may process the gaze location or other ROI indicator and generate the binning information for the camera(s) 150-1 and/or the ISP pipe 420. For example, the binning information may identify one or more groups of pixels, and one or more respective readout resolutions for the one or more groups. For example, the binning information may identify a portion of a pixel array (e.g., a portion around the gaze location or other ROI indicator) to be read out at full resolution (e.g., one individual pixel value read out for each individual sensor pixel), and one or more other portions of the pixel array that are to be read out a one or more reduced resolutions, as discussed in further detail hereinafter.

Figure 5:
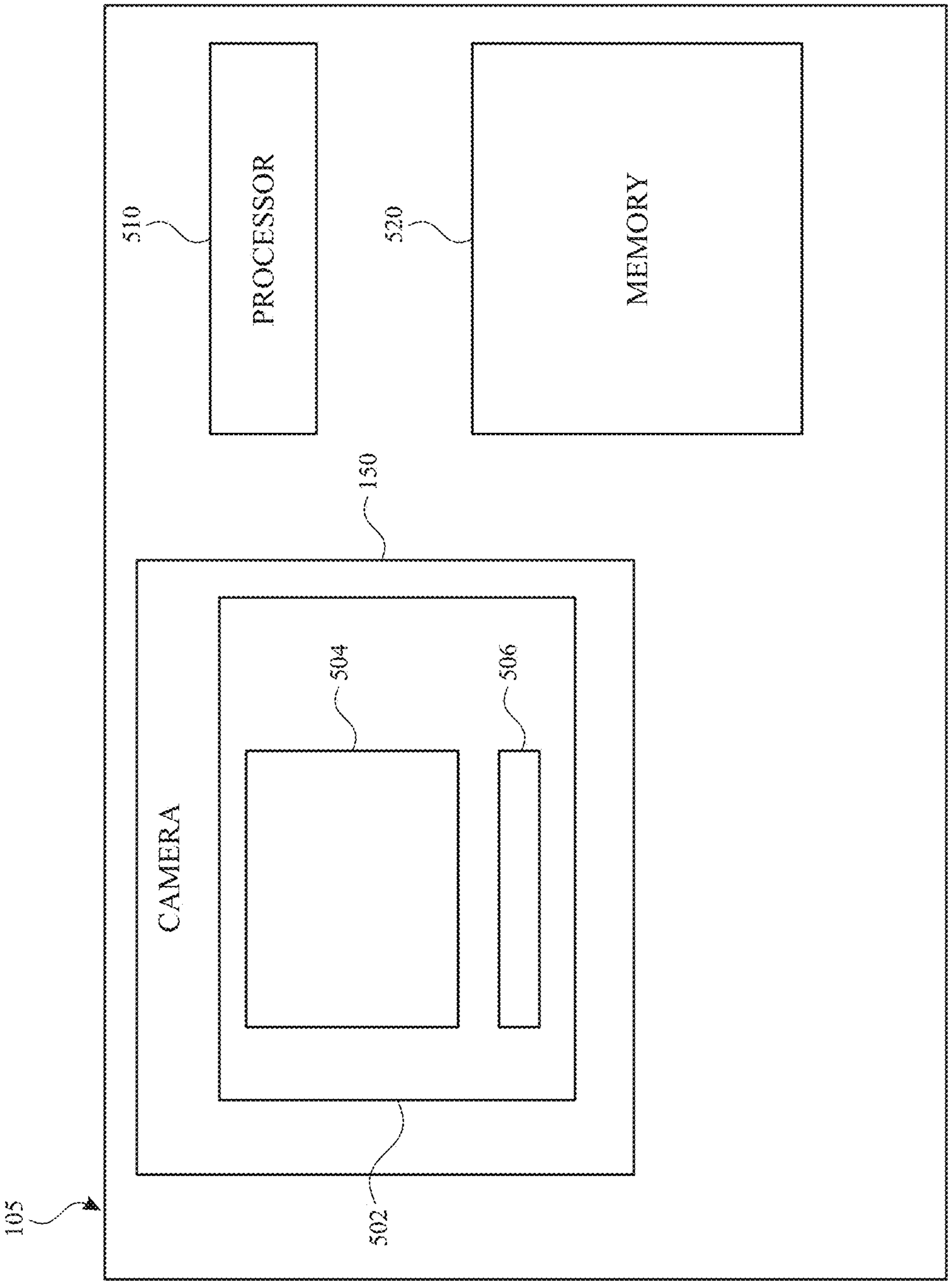
FIG. 5 is a block diagram illustrating components of an electronic device in accordance with one or more implementations of the subject technology.

FIG. 5 is a block diagram illustrating components of an electronic device in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 5, electronic device 105 includes a processor 510, memory 520, and a camera 150 (e.g., camera 150-1 of FIG. 4). While not depicted in FIG. 5, electronic device 105 also may include the other components in addition to the camera. Processor 510 may include suitable logic, circuitry, and/or code that enable processing data and/or controlling operations of electronic device 105. In this regard, processor 510 may be enabled to provide control signals to various other components of electronic device 105. Processor 510 may also control transfers of data between various components of electronic device 105. Additionally, the processor 510 may enable implementation of an operating system or otherwise execute code to manage operations of electronic device 105.

Processor 510 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Although a single processor is shown in FIG. 5, it is appreciated that the electronic device 105 may include multiple processors (e.g., multiple separate processors, multiple separate processors on an common SoC and/or multiple processors on multiple separate SoCs).

Memory 520 may include suitable logic, circuitry, and/or code that enable storage of various types of information such as received data, generated data, code, and/or configuration information. Memory 520 may include, for example, random access memory (RAM), read-only memory (ROM), flash memory, and/or magnetic storage. In one or more implementations, memory 520 may store code, executable by the processor 510 for performing some or all of the operations of the ISP pipe 420, the blending block 430, the computer vision processes 440, the rendering block 450, and/or the display pipe 460 of FIG. 4. The subject technology is not limited to these components both in number and type, and may be implemented using more components or fewer components than are depicted in FIG. 5.

As shown, camera 150 may include one or more image sensors, such as image sensor 502. The image sensor 502 may include an array 504 of sensor pixels (e.g., arranged in rows and columns of sensor pixels). The image sensor 502 may also include readout circuitry 506. The readout circuitry 506 may control which sensor pixels of the array 504 are read out at a particular time, and/or may provide processing of analog sensor pixel signals, including analog-to-digital conversion of sensor information read out from the sensor pixels. Digital image frames generated by the readout circuitry 506 may be provided to the processor 510 for further processing. In the example of FIG. 5, the processor 510 is separate from (e.g., formed on a separate chip and communicatively coupled to) the image sensor 502. In one or more other implementations, the image sensor 502 may be formed on an SoC that includes the processor 510 and/or one or more other processors that process digital image data from the readout circuitry 506.

Figure 6:
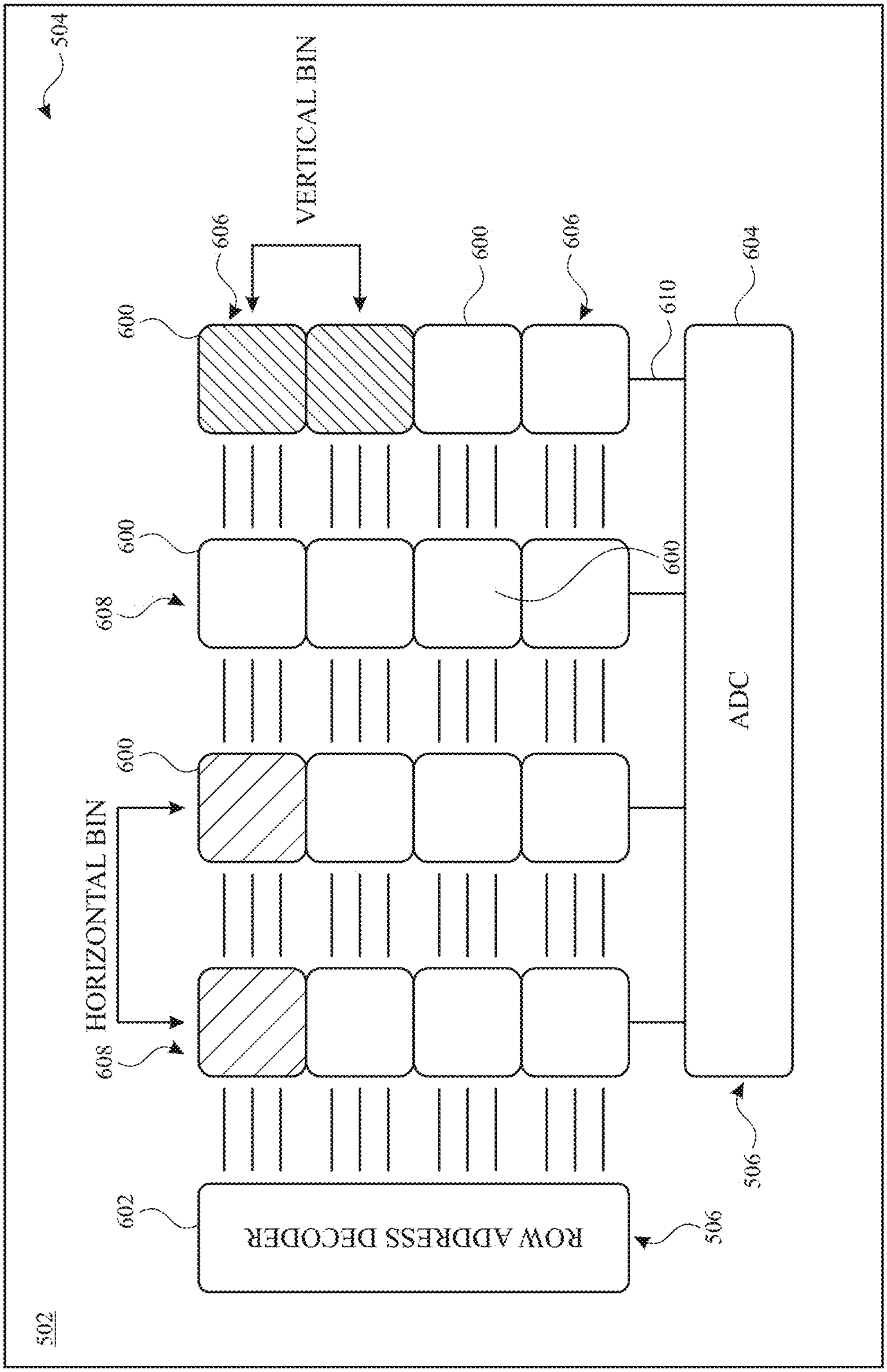
FIG. 6 illustrates a block diagram of an example image sensor having an array of sensor pixels in accordance with one or more implementations of the subject technology.

FIG. 6 illustrates an example of an array 504 of sensor pixels 600, and readout circuitry 506 including a row address decoder 602 and analog-to-digital (ADC) circuitry 604. As shown, the sensor pixels 600 may be arranged in rows 606 and columns 608 of sensor pixels 600. The example of FIG. 6 illustrates a four pixel by four pixel array; however, this is merely illustrative and arrays of sensor pixels may include many more rows and columns (e.g., tens, hundreds, or thousands of rows and columns of tens, hundreds, thousands, millions, or billions or sensor pixels). During operation of the image sensor 502, the row address decoder 602 may address one or more rows 606 of the sensor pixels 600 at a time for readout along data lines 610 to the ADC circuitry 604.

As indicated in FIG. 6, in a foveated readout of the sensor pixels 600 of the array 504, the sensor information (e.g., charge or voltage) captured by two or more of the sensor pixels 600 may be binned (e.g., combined, such as averaged or summed) within the array 504 (e.g., prior to readout by the ADC circuitry 604), such as in a horizontal dimension (e.g., along a row 606) and/or a vertical dimension (e.g., along a column 608) of the array 504. In this way, rather than reading out and processing each sensor pixel 600 by the ADC circuitry 604, a reduced number of binned values may be read out and processed by the ADC circuitry 604 in some regions of the array, such as regions away from a determined ROI indicator such as a gaze location or other indicator. As discussed in further detail hereinafter, after binning and readout, additional binning (e.g., of binned values previously binned within the pixel array) may also be performed by the ADC circuitry 604 (e.g., to further reduce the resolution and number of pixel values for transmission and digital processing).

Figure 7:
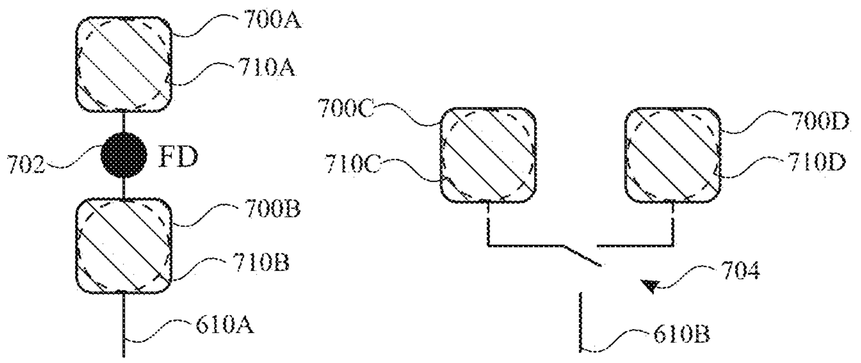
FIG. 7 illustrates an example of in-array binning for foveated sensor readout in accordance with one or more implementations of the subject technology.
Figure 8:
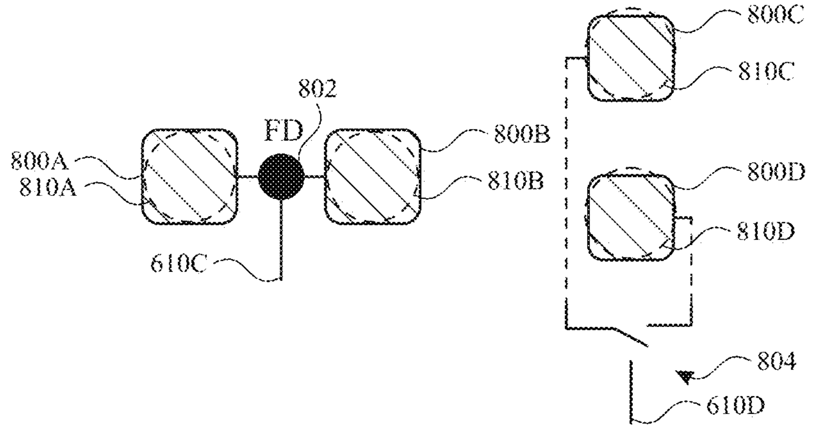
FIG. 8 illustrates another example of in-array binning for foveated sensor readout in accordance with one or more implementations of the subject technology.
Figure 9:
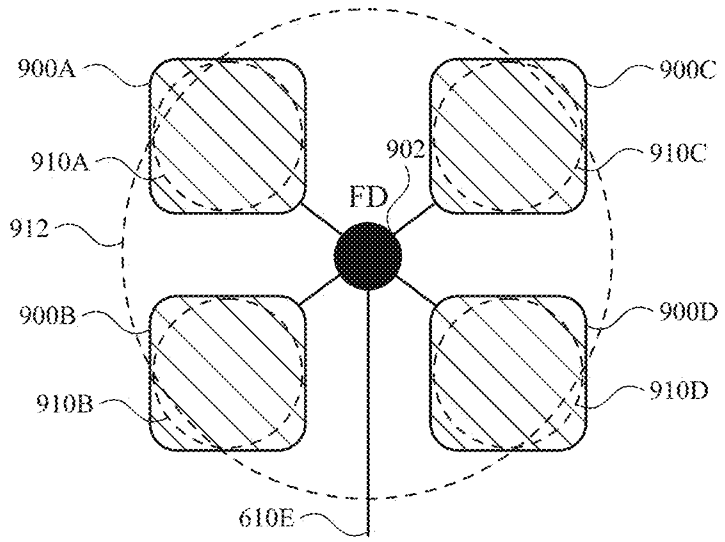
FIG. 9 illustrates yet another example of in-array binning for foveated sensor readout in accordance with one or more implementations of the subject technology.

FIGS. 7-9 illustrate various examples of binning operations that may be performed within the array 504 of sensor pixels 600. For example, FIG. 7 illustrates an implementation in which sensor information from a first sensor pixel and a second sensor pixel are binned, in a vertical direction (e.g., along a column of the array 504), by combining the sensor information of a first sensor pixel and a second sensor pixel in a single floating diffusion region 702 within the array of sensor pixels. For example, the sensor information (e.g., charge) accumulated by a sensor element 700A (e.g., a photodiode) of one sensor pixel 600 and sensor information (e.g., charge) accumulated by a sensor element 700B (e.g., a photodiode) of another sensor pixel 600 may be combined in the floating diffusion region 702 prior to the combined charge in the floating diffusion region 702 being read out along a data line 610A by the ADC circuitry 604.

In the example of FIG. 7, sensor information from a third sensor pixel and a fourth sensor pixel are binned, in a horizontal direction (e.g., along a row of the array 504) by shorting together (e.g., using a switch 704) a sensor element 700C (e.g., a photodiode) of the third sensor pixel 600 with a sensor element 700D (e.g., a photodiode) of the fourth sensor pixel prior to the sensor elements being read out along a data line 610B coupled to the shorted sensor element 700C and sensor element 700D. As shown in FIG. 7, the sensor elements 700A, 700B, 700C, and 700D may have associated respective color filter elements 710A, 710B, 710C, and 710D. In other implementations, sensor elements 700A, 700B, 700C, and 700D may be monochrome sensor elements having color filter elements without any color, or being free of color filter elements. Binning of sensor information captured by the sensor pixels 600 may be performed by binning sensor pixels 600 (or sub-pixels thereof) having the same color (e.g., sensor pixels that are covered by color filter elements of the same color). For example, the color filter elements 710A and 710B may have the same color (e.g., both may be green, both may be blue, or both may be red, in some examples), and the color filter elements 710C and 710D may have the same color (e.g., both may be green, both may be blue, or both may be red, in some examples). In various implementations, the sensor elements 700A and 700B may be sensor elements corresponding to sub-pixels of the same sensor pixel 600 (e.g., a color sensor pixel), or may be sensor elements corresponding to (e.g., sub-pixels of) two different sensor pixels 600, and/or the sensor elements 700C and 700D may be sensor elements corresponding to sub-pixels of the same sensor pixel 600 (e.g., a color sensor pixel), or may be sensor elements corresponding to (e.g., sub-pixels of) two different sensor pixels 600 (e.g., depending on a type or layout of a color filter array including the color filter elements 710A, 710B, 710C, and 710D).

As another example, FIG. 8 illustrates an implementation in which sensor information from a first sensor pixel and a second sensor pixel are binned, in a horizontal direction (e.g., along a row of the array 504), by combining the sensor information of a first sensor pixel and a second sensor pixel in a single floating diffusion region 802 within the array of sensor pixels. For example, the sensor information (e.g., charge) accumulated by a sensor element 800A (e.g., a photodiode) of one sensor pixel 600 and sensor information (e.g., charge) accumulated by a sensor element 800B (e.g., a photodiode) of another sensor pixel 600 may be combined in the floating diffusion region 802, prior to the combined charge in the floating diffusion region being read out along a data line 610C by the ADC circuitry 604.

In the example of FIG. 8, sensor information from a third sensor pixel and a fourth sensor pixel are binned, in a vertical direction (e.g., along a column of the array 504), by shorting together (e.g., using a switch 804) a sensor element 800C (e.g., a photodiode) of the third sensor pixel 600 with a sensor element 800D (e.g., a photodiode) of the fourth sensor pixel, prior to the shorted sensor elements being read out along a data line 610D coupled to the shorted sensor element 800C and sensor element 800D. As shown in FIG. 8, the sensor elements 800A, 800B, 800C, and 800D may have associated respective color filter elements 810A, 810B, 810C, and 810D. In other implementations, sensor elements 800A, 800B, 800C, and 800D may be monochrome sensor elements having color filter elements without any color, or being free of color filter elements. Binning of sensor information captured by the sensor pixels 600 may be performed by binning sensor pixels 600 (or sub-pixels thereof) having the same color (e.g., covered by color filter element of the same color). For example, the color filter elements 810A and 810B may have the same color (e.g., both may be green, both may be blue, or both may be red, in some examples), and the color filter elements 810C and 810D may have the same color (e.g., both may be green, both may be blue, or both may be red, in some examples). In various implementations, the sensor elements 800A and 800B may be sensor elements corresponding to sub-pixels of the same sensor pixel 600 (e.g., a color sensor pixel), or may be sensor elements corresponding to (e.g., sub-pixels of) two different sensor pixels 600, and/or the sensor elements 800C and 800D may be sensor elements corresponding to sub-pixels of the same sensor pixel (e.g., a color sensor pixel) 600, or may be sensor elements corresponding to (e.g., sub-pixels) of two different sensor pixels 600 (e.g., depending on a type or layout of a color filter array including the color filter elements 810A, 810B, 810C, and 810D).

FIG. 9 illustrates another example in which sensor information may be binned by combining the sensor information from multiple sensor elements in a single floating diffusion region. In the example of FIG. 9, sensor elements 900A, 900B, 900C, and 900D (e.g., photodiodes) are coupled to a single common floating diffusion region 902 within the array of sensor pixels. In one or more implementations, sensor information (e.g., charge) accumulated by two, three, or four of the sensor elements 900A, 900B, 900C, and 900D may be combined in the floating diffusion region 902, prior to the combined charge in the floating diffusion region 902 being read out along a data line 610E by the ADC circuitry 604. For example, the sensor elements 900A, 900B, 900C, and 900D may have corresponding color filter elements 910A, 910B, 910C, and 910D having the same color, and may thus be binned into a single common floating diffusion region 902. In other implementations, sensor elements 900A, 900B, 900C, and 900D may be monochrome sensor elements having color filter elements without any color, or being free of color filter elements. For example, a color filter array including the color filter elements 910A, 910B, 910C, and 910D having the same color may be a different type (e.g., a Quad, Quadra, or Quad Bayer type) of color filter array from the color filter array(s) (e.g., Bayer type color filter array(s)) having the color filter elements 710A, 710B, 710C, 710D, 810A, 810B, 810C, and/or 810D. In this way, the binning of sensor information within the array 504 of sensor pixels 600 may be based at least, in part, on a type of color filter array. In various examples, the sensor elements 900A, 900B, 900C, and 900D having color filter elements of the same color may be referred to as sensor pixels 600, or as sub-pixels of a single (e.g., monochrome) sensor pixel 600. Because the color filter elements 910A, 910B, 910C, and 910D have the same color in this example, individual color filter elements for each sensor element may be replaced with a single larger color filter element 912 that covers all of the sensor elements 900A, 900B, 900C, and 900D, in some examples. In the example of FIG. 9, sensor elements 900A, 900B, 900C, and 900D (e.g., photodiodes) are coupled to a single common floating diffusion region 902. However, in other implementations, pixel values from the sensor elements 900A, 900B, 900C, and 900D can be binned using switches in horizontal and vertical directions (e.g., without any charge summing in a common floating diffusion region).

Figure 10:
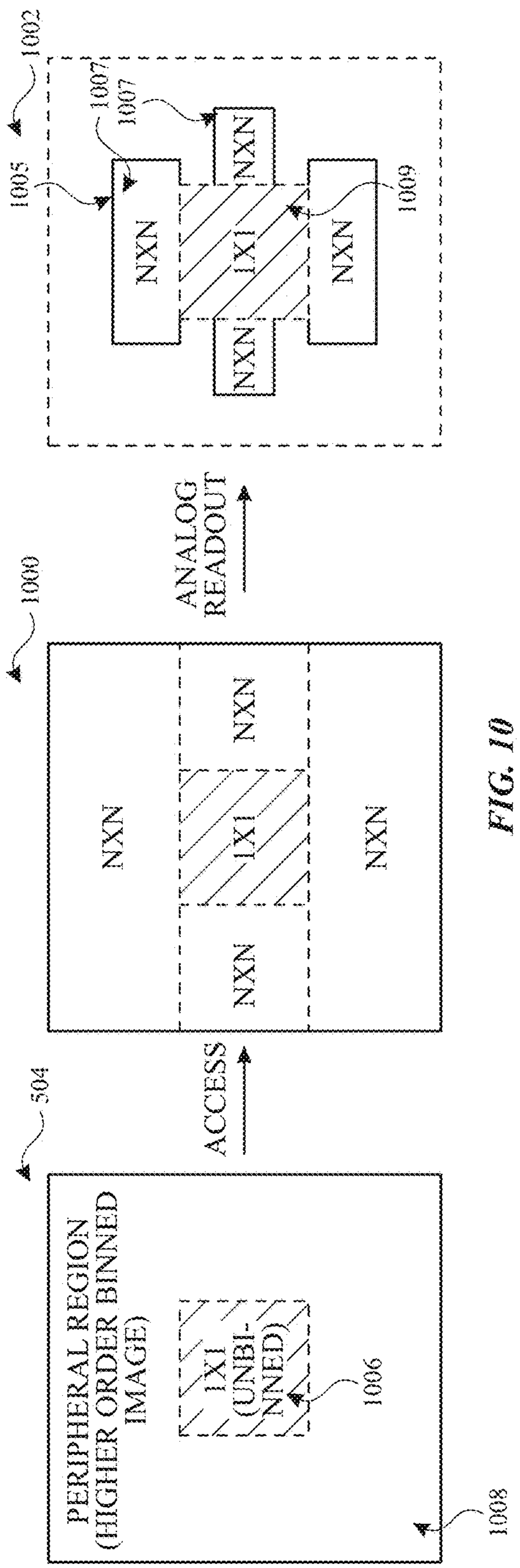
FIG. 10 illustrates an example data flow for foveated sensor readout in accordance with one or more implementations of the subject technology.

FIG. 10 illustrates an example of foveated sensor readout operations that may be performed using an array of sensor pixels, such as the array 504 of sensor pixels 600. As shown in FIG. 10, a region 1006 of the array 504 may be identified as corresponding to a high resolution portion of a foveated image frame (e.g., for generating the first portion 306 of image frame 300 of FIG. 3), and a region 1008 of the array 504 may be identified as corresponding to a relatively lower resolution portion of the foveated image frame (e.g., for generating the second portion 308 of image frame 300 of FIG. 3). The locations of the regions 1006 and 1008 may be based on an ROI indicator such as a current location of the gaze of user (in some examples). As shown, in a binning operation 1000, the array 504 may be accessed (e.g., by the ADC circuitry 604) to read out all sensor pixels (e.g., 1×1, or un-binned, individual pixel values from each sensor pixel 600) in the region 1006, and to read out N×N binned pixel values in the region 1008. That is, to reduce the resolution of a portion of an image frame by a factor of 1/N, wherein N is an integer (e.g., a multiple of two) the sensor information captured by each group of N×N sensor pixels 600 in the reduced resolution region of the array 504 may be binned into a single binned pixel value. More generally, the resolution of an image frame may be reduced by binning the sensor information captured by one or more groups of M×N sensor pixels 600 (in a reduced resolution region) into a single binned pixel value, where M and N are integer values greater than or equal to one.

As shown in FIG. 10, because there are fewer binned pixel values in the region 1008 than there are physical sensor pixels in the region 1008, a sensor output 1002 (e.g., a foveated sensor output) generated by the array 504 includes a reduced number of image pixel values 1005 (e.g., relative to a full image frame from the array 504 that includes an individual pixel value from each sensor pixel 600 in the array). As shown, the sensor output 1002 may be output by the image sensor 502 with the individual pixel values 1009 (from individual sensor pixels 600) and a non-uniform (e.g., warped) arrangement of the binned pixel values 1007 (e.g., each combining the sensor information from multiple sensor pixels 600). In one or more implementations, a foveated image frame 300 may be generated from the sensor output 1002 by repeating each of the binned pixel values 1007 of the sensor output 1002 in N×N image pixel values of the foveated image frame 300. In one or more implementations, the foveated image frame 300 may be generated for processing by one or more processing blocks (e.g., computer vision processes 440, blending block 430, or display pipe 460) at the electronic device prior to display by the display 125, or the foveated sensor output 1002 may be processed by the one or more processing blocks in the non-uniform (e.g., warped) arrangement of FIG. 10 until the foveated image frame 300 is generated for display as a frame of a pass-through video frame for the view 220.

Figure 11:
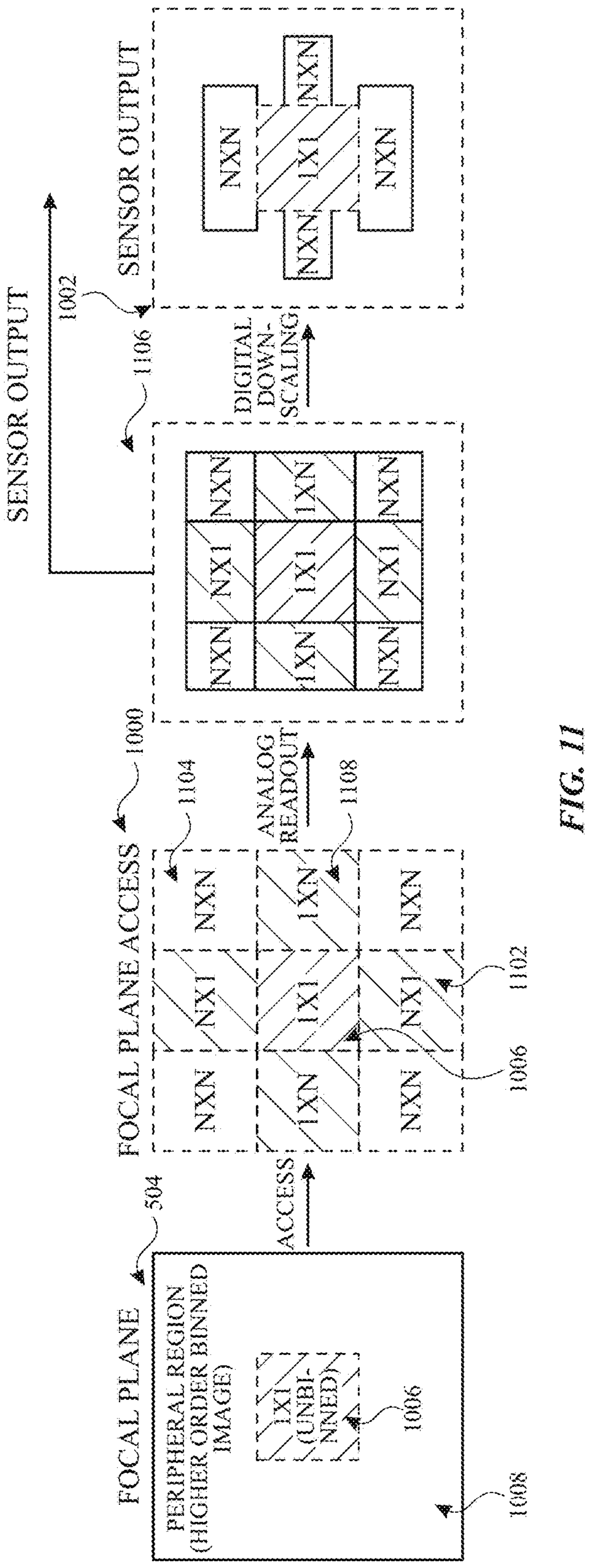
FIG. 11 illustrates an example data flow for foveated sensor readout for an image sensor with a first type of color filter array (CFA) in accordance with one or more implementations of the subject technology.

Generating the sensor output 1002 may be performed in various different ways (e.g., depending on the architecture of the array 504 of sensor pixels 600, and/or the arrangement or type of the color filter array thereon). For example, FIG. 11 illustrates operations that may be performed for generating the sensor output 1002 (e.g., according to the regions 1006 and 1008, as defined based on an ROI indicator such as the gaze location of the user) using the pixel architecture of FIG. 7 or FIG. 8. As shown in FIG. 11, the array 504 may be accessed (e.g., by the ADC circuitry 604) to read out all sensor pixels (e.g., 1×1, or un-binned, individual pixel values from each sensor pixel 600) in the region 1006, and to read out N×N binned pixel values in regions 1104 within the region 1008 that do not include any rows or columns from which individual pixel values from the region 1006 are read out. That is, N×N binning of sensor pixels in the regions 1104 may be performed within the array 504 (e.g., using the binning operations described herein in connection with FIGS. 7 and/or 8). As shown, in regions 1102 within the region 1006 that include a column that extends through the region 1006, binning within the array 504 may be limited to N×1 binning. In regions 1108 within the region 1006 that include a row that extends through the region 1006, binning within the array 504 may be limited to 1×N binning. In this example, a binned analog readout 1106 of the array 504 may include a uniform (e.g., constant size, or uniform resolution in image pixel value space, across both the horizontal (row) and vertical (column) directions) output frame of reduced size (e.g., in comparison with a full resolution image frame including an individual pixel value for every sensor pixel 600).

In one or more implementations, the sensor output 1002 may be generated from the binned analog readout 1106 by performing a further digital binning of the regions 1102 and 1108 to form N×N (in this example) binned pixel values 1007. Digital binning (e.g., digital downsizing or downscaling) to form the foveated sensor output 1002 may be performed by additional processing circuitry formed on the same SoC as the array 504 and/or the ADC circuitry 604 (e.g., logical processes after the ADC in the image sensor), and/or by additional processing circuitry (e.g., processor 510) separate from (e.g., and communicatively connected to) the image sensor 502. As indicated in the figure, in one or more other implementations, the binned analog readout 1106 may be digitized (e.g., by ADC circuitry 604 and without further digital binning) and provided as a (e.g., rasterized) sensor output for generating a foveated image frame (e.g., image frame 300). Outputting the digitized version of the binned analog readout 1106 may be advantageous, in that subsequent processing blocks may operate on the data therein using rasterized operations (e.g., in comparison with processing the non-uniformly distributed pixel values in a sensor output such as the sensor output 1002).

Figure 12:
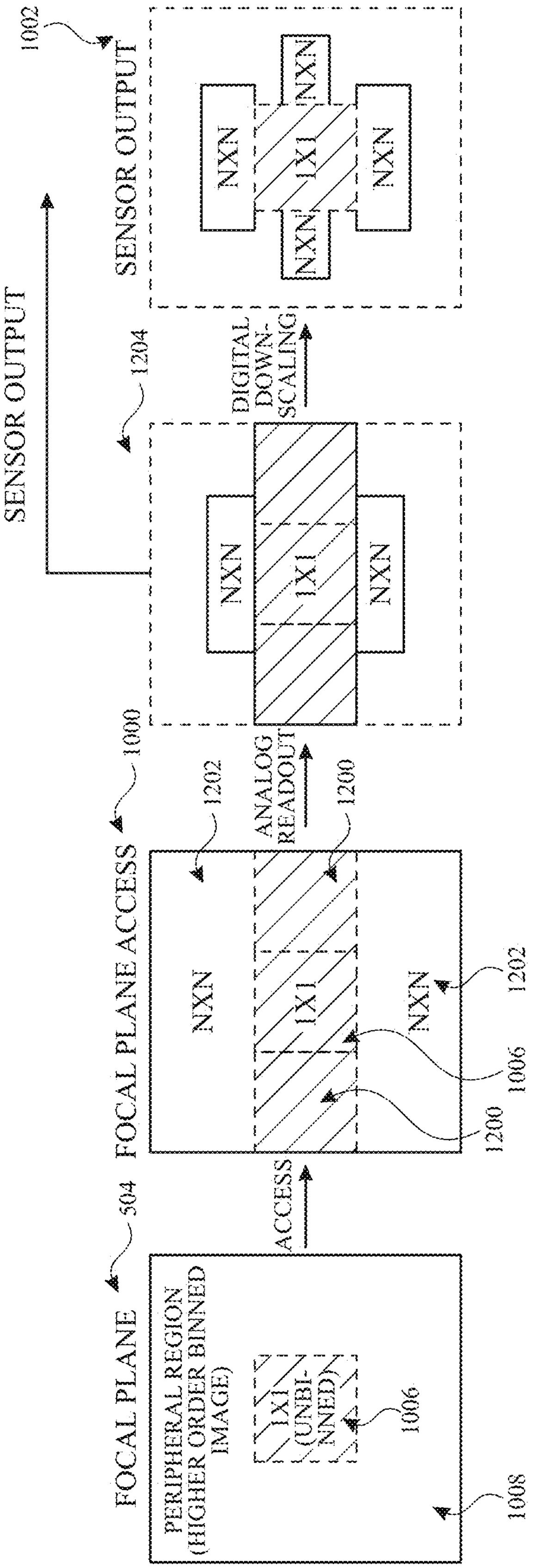
FIG. 12 illustrates an example data flow for foveated sensor readout for an image sensor with a second type of color filter array (CFA) in accordance with one or more implementations of the subject technology.

FIG. 12 illustrates operations that may be performed for generating the sensor output 1002 (e.g., according to the regions 1006 and 1008 as defined based on an ROI indicator such as the gaze location of the user) using the pixel architecture of FIG. 9. As shown in FIG. 12, the array 504 may be accessed (e.g., by the ADC circuitry 604) to read out all sensor pixels (e.g., 1×1, or un-binned, individual pixel values from each sensor pixel 600) in the region 1006, and in regions 1200 of the region 1008 that share a row with the region 1006. The array 504 may also be accessed (e.g., by the ADC circuitry 604) to read out N×N binned pixel values in regions 1202 of the region 1008 that do not include any rows from which individual pixel values from the region 1006 are read out. That is, N×N binning of sensor pixels in the regions 1202 may be performed within the array 504 (e.g., using the binning operations described herein in connection with FIG. 9). In this example, a binned analog readout 1204 of the array 504 may include a non-uniform (e.g., varying in size, or having a non-uniform resolution in image pixel value space, across both the horizontal (row) and vertical (column) directions) output frame of reduced size (e.g., in comparison with a full resolution image frame including an individual pixel value for every sensor pixel 600).

As shown in FIG. 12, the sensor output 1002 may be generated from the binned analog readout 1204 by performing a digital binning of the regions 1200 to form the remainder of the N×N binned pixel values 1007. As indicated in the figure, in one or more other implementations, the binned analog readout 1204 may be digitized (e.g., by ADC circuitry 604 and without further digital binning) and provided as a sensor output for generating a foveated image frame (e.g., image frame 300).

Figure 13:
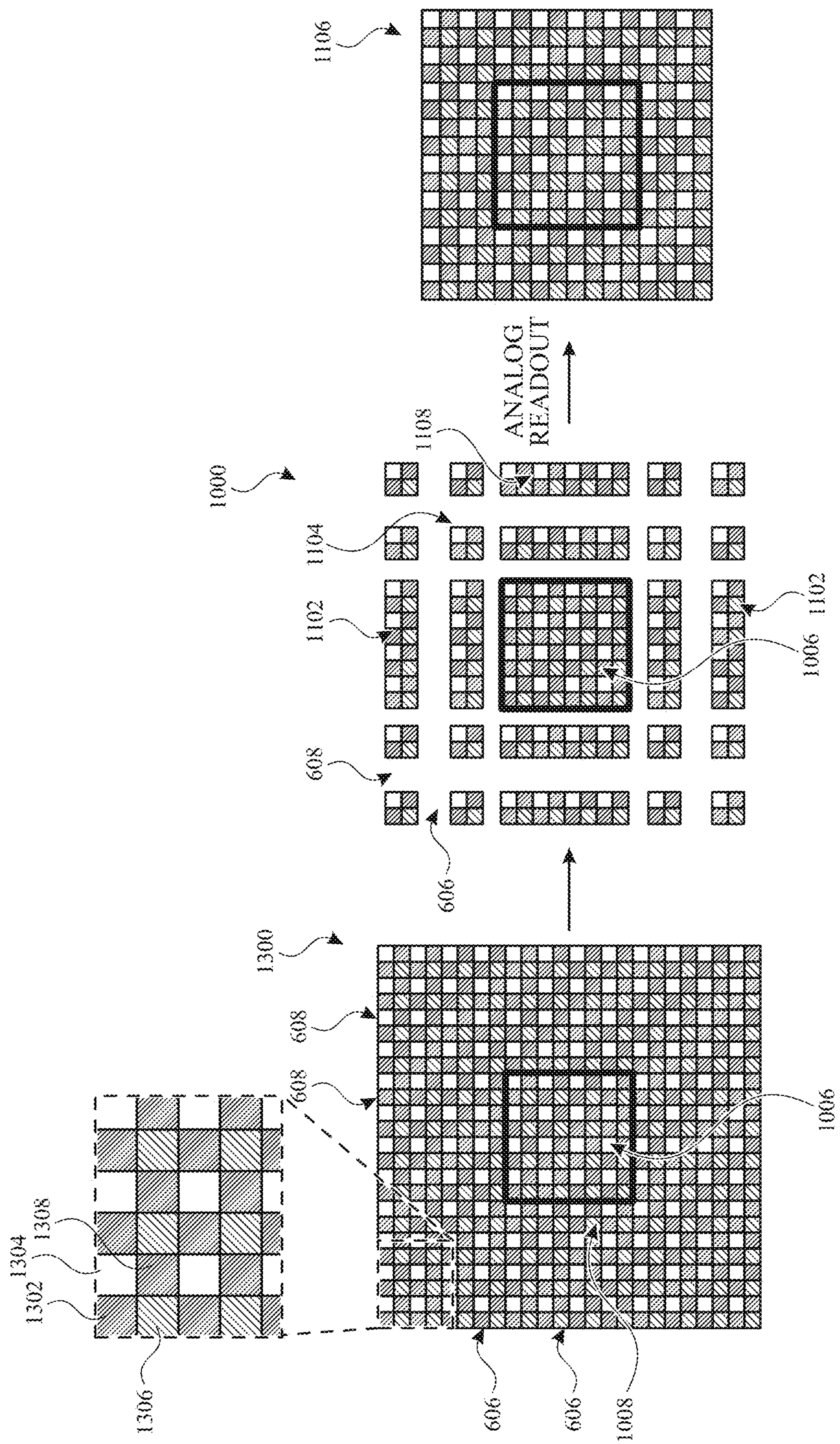
FIG. 13 illustrates color aspects of the example data flow of FIG. 11 in accordance with one or more implementations of the subject technology.
Figure 14:
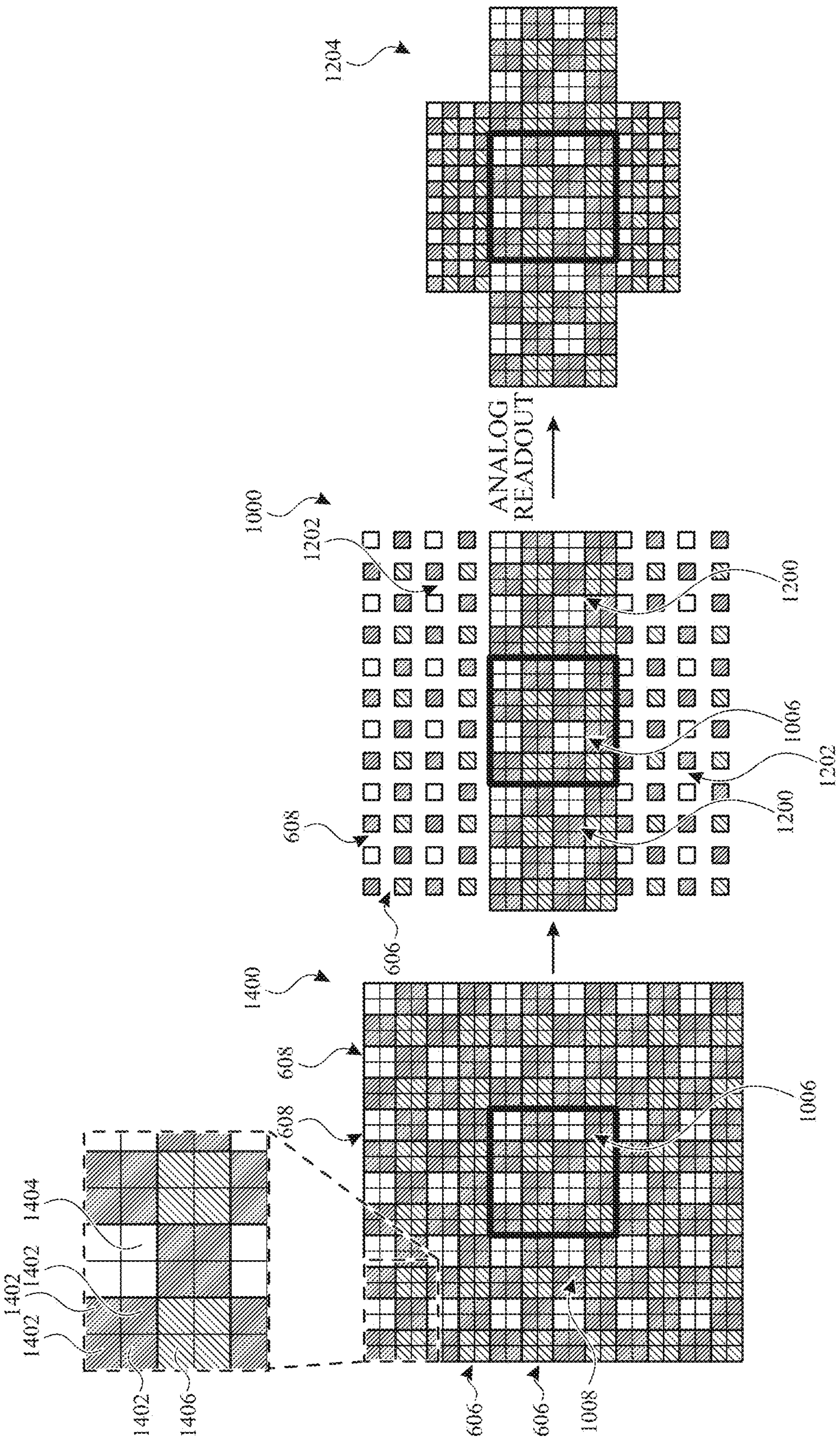
FIG. 14 illustrates color aspects of the example data flow of FIG. 12 in accordance with one or more implementations of the subject technology.

FIGS. 13 and 14 illustrate examples of how the type (e.g., Bayer, Quad Bayer, etc.) of a color filter array may affect the subset of the sensor pixels that are read out from the array 504 to form a foveated sensor output. For example, FIG. 13 illustrates a color filter array 1300 having a Bayer pattern of color filter elements (e.g., repeating patterns of two green color filter elements 1302 and 1308 in a 2×2 arrangement with a red color filter element 1304 and a blue color filter element 1306). For example, the color filter array 1300 may be formed over the array 504 of sensor pixels 600 (e.g., with each sensor pixel 600 being covered by a corresponding color filter element). In this example, each 2×2 set of sensor pixels with a corresponding 2×2 pattern of color filter elements 1302, 1304, 1306, and 1308 may be referred to as sensor a color sensor pixel having four sub-pixels. As shown in FIG. 13, because binning of sensor pixels is performed for sub-pixels of the same color (e.g., having the color filter elements of the same color), the binning in the presence of a Bayer pattern color filter array may be performed across different color sensor pixels (e.g., across different 2×2 groups of sub-pixels). In one or more implementations, the readout circuitry 506 may be unable to perform N×N binning within the array 504 for regions 1102 and 1108, resulting in the N×1 and 1×N binning in those regions as described in connection with FIG. 11, while N×N binning can be performed in the regions 1104. As shown in FIG. 13, by compacting the sensor information read out from the regions 1006, 1102, 1104, and 1108, the uniform binned analog readout 1106 can be generated.

FIG. 14 illustrates a color filter array 1400 having a Quad Bayer pattern of color filter elements (e.g., alternating 2×2 groups of color filter elements of the same color). In this example, 2×2 groups of green color filter elements 1402 alternate with 2×2 groups of red color filter elements 1404 in some rows 606 and columns 608, and 2×2 groups of green color filter elements 1402 alternate with 2×2 groups of blue color filter elements 1406 in other rows 606 and columns 608. For example, the color filter array 1400 may be formed over the array 504 of sensor pixels 600 (e.g., with each sensor pixel 600 being covered by a corresponding color filter element). As shown in FIG. 14, because binning of sensor pixels is performed for pixels of the same color (e.g., having the color filter elements of the same color), the binning in the presence of a Quad Bayer pattern color filter array may be performed within the 2×2 groups of pixels of the same color. In one or more implementations, the readout circuitry 506 may be unable to perform binning within the array 504 for regions 1200 that share a row with the full resolution region 1006, resulting in the individual pixel readout in those regions as described in connection with FIG. 12, while N×N binning can be performed in the regions 1202. As shown in FIG. 14, by compacting the sensor information read out from the regions 1202, the non-uniform binned analog sensor readout 1204 can be generated.

Various examples discussed herein describe foveated sensor readout using two regions (e.g., regions 1006 and 1008) of an array 504 of sensor pixels 600, with two corresponding resolutions (e.g., binning levels). However, foveated image frames with more than two regions with more than two corresponding resolutions may be generated by an image sensor in some implementations. For example, a multi-step binning process (e.g., as described hereinafter in connection with FIGS. 15, 16, and/or 17) may be performed in which multi-step binning is done as part of the pixel access (e.g., the ADC may read out regions with different binned resolutions for optimal power). In one or more other examples, a multi-step binning process may include a first binning operation that is performed within the array 504, and one or more additional binning operations that are performed within the image sensor external to the pixel array (e.g., by the ADC circuitry 604) and/or by subsequent processing circuitry (e.g., processor 510) external to the image sensor.

Figure 15:
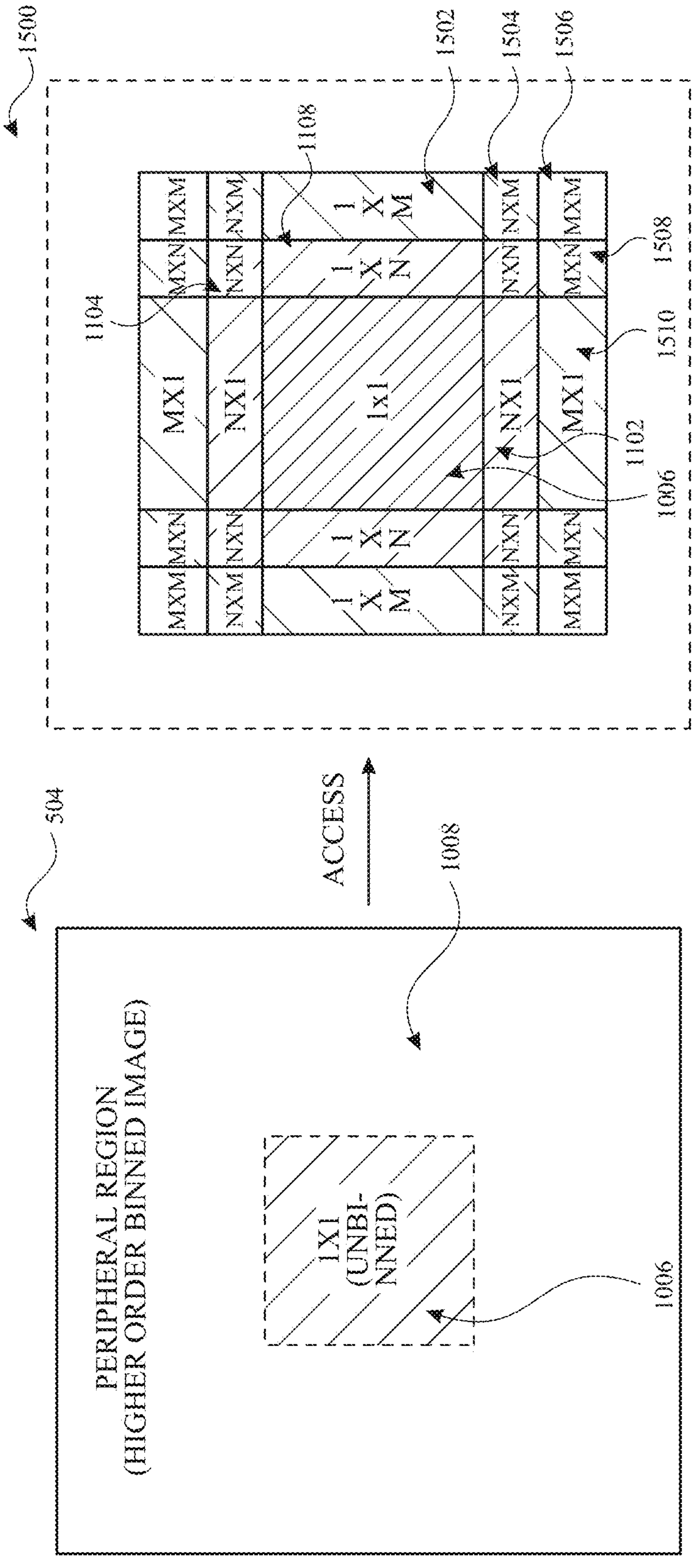
FIG. 15 illustrates an example of multi-step binning for foveated sensor readout in accordance with one or more implementations of the subject technology.

For example, FIG. 15 illustrates an example use case in which a multi-step binning operation is performed within the array 504 with a 1×1 (e.g., Bayer) color filter array, to generate a binned analog readout. In one or more implementations, a multi-step binning operation within the array may include two or more stages of floating diffusion charge summing and/or shorting using switches (e.g., as described herein in connection with FIGS. 7 and 8) to reach a desired binning level in a given ROI. As shown, in a multi-step binning operation, as part of the pixel access, depending upon the ROI being readout, the sensor can be configured to perform binning (e.g., before the ADC converts the pixel values to digital values), and may generate further binned regions in a sensor output 1500. The further binned regions may include 1×M binned regions 1502 (e.g., regions in which pixel values from four sensor pixels 600 in a row 606 are combined to form a single binned pixel value in an example in which M=4), N×M binned regions 1504 (e.g., regions in which pixel values from eight sensor pixels 600 in two rows 606 and four columns 608 are combined to form a single binned pixel value in an example in which M=4 and N=2), M×M binned regions 1506 (e.g., regions in which pixel values from sixteen sensor pixels 600 in four rows 606 and four columns 608 are combined to form a single binned pixel value in the example in which M=4), M×N binned regions 1508 (e.g., regions in which pixel values from eight sensor pixels 600 in four rows 606 and two columns 608 are combined to form a single binned pixel value in the example in which M=4 and N=2), and/or M×1 binned regions 1510 (e.g., regions in which pixel values from four sensor pixels 600 in a column 608 are combined to form a single binned pixel value in the example in which M=4). In one or more implementations, further digital binning of the binned pixel values in the regions 1102, 1104, 1108, 1502, 1504, 1506, 1508, and/or 1510 may also be performed (e.g., to smooth the gradient between the high resolution first portion 306 and the low resolution outer portions of a foveated image frame 300). In the example of FIG. 15, the sensor output 1500 includes nine unique ROIs for tessellated output.

Figure 16:
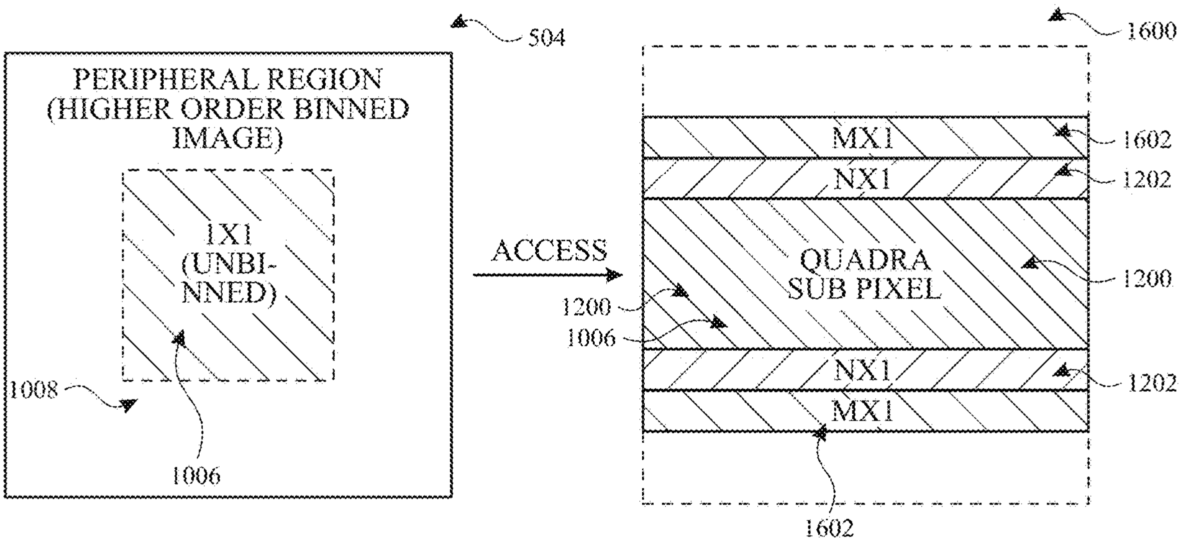
FIG. 16 illustrates another example of multi-step binning for foveated sensor readout in accordance with one or more implementations of the subject technology.
Figure 17:
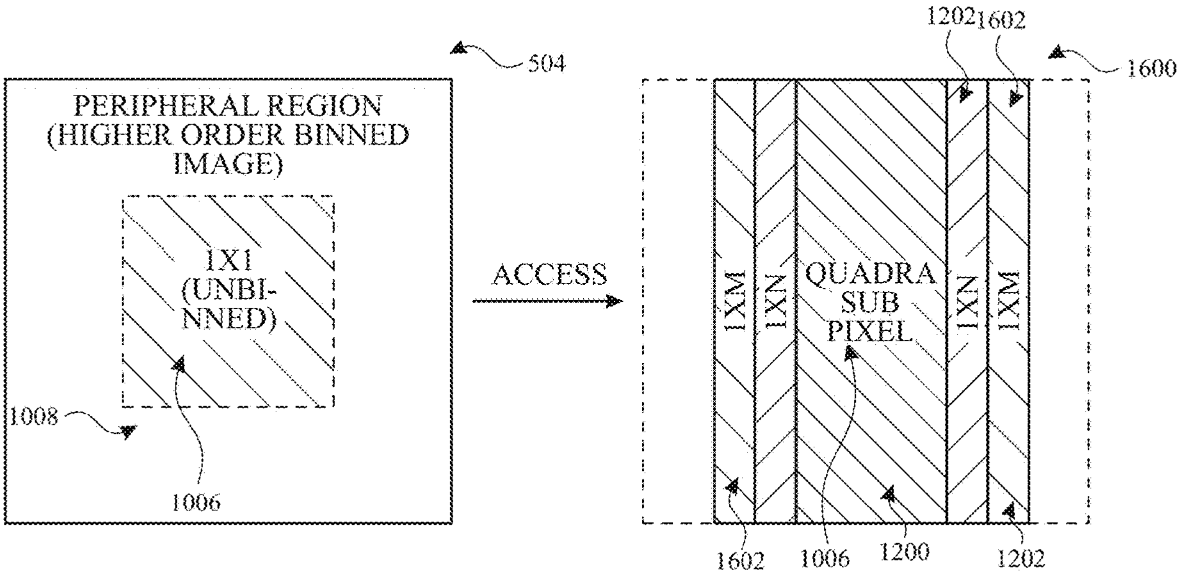
FIG. 17 illustrates yet another example of multi-step binning for foveated sensor readout in accordance with one or more implementations of the subject technology.

FIG. 16 illustrates a use case in which a multi-step binning operation is performed within the array 504 with a 2×2 (e.g., Quadra or Quad Bayer) color filter array to generate a binned analog readout. As shown, a multi-step binning operation (e.g., as part of the pixel access and before ADC conversion) in this example may form binned regions 1202 and further binned regions such as further binned regions 1602. In one or more implementations, still further digital binning of the binned pixel values in the regions 1200, 1202, and/or 1602 may also be performed (e.g., to smooth the gradient between the high resolution first portion 306 and the low resolution outer portions of a foveated image frame 300). In the example of FIG. 16, the sensor output 1600 includes three unit ROIs for variable rate output. FIGS. 12, 14, and 16 illustrate examples of foveated sensor readout in which row-wise readout of the array 504 is performed (e.g., in an implementation in which the color filter array is a Quad color filter array). In one or more other implementations, the foveated sensor readout may also be performed for an image sensor that uses column-wise readout. For example, FIG. 17 illustrates an example in which foveated column-wise readout of the array 504 is performed (e.g., in an implementation in which the color filter array is a Quad color filter array), and a multi-step binning operation as described in FIG. 16 is performed.

Figure 18:
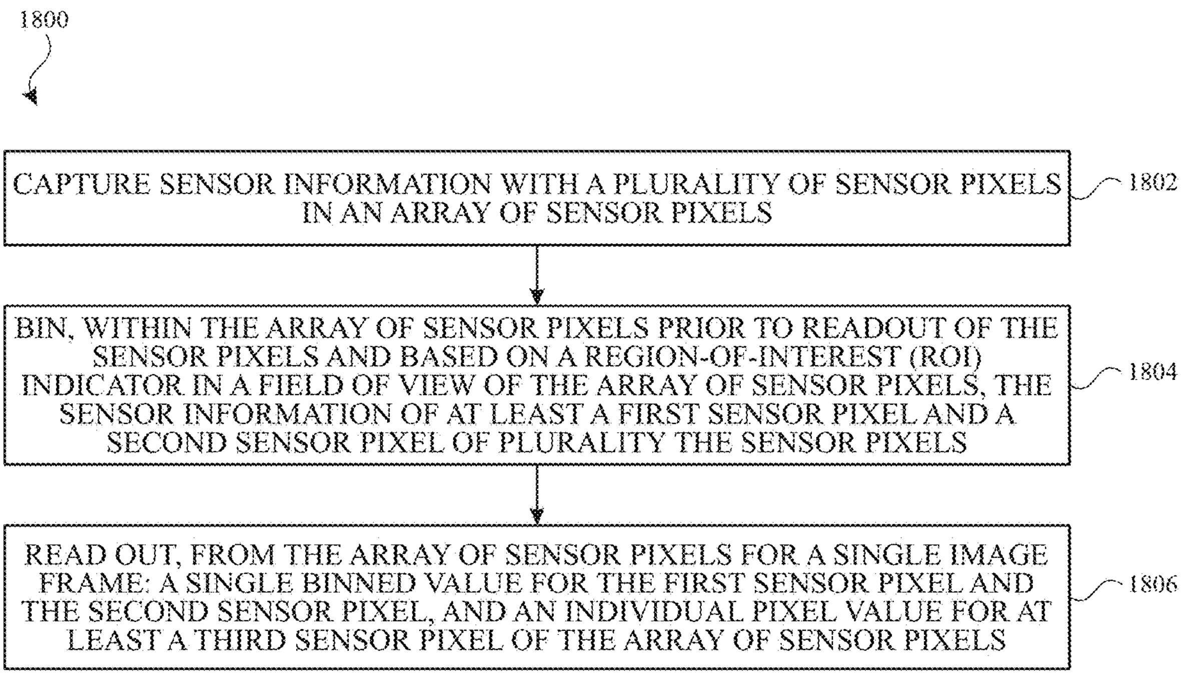
FIG. 18 illustrates a flow diagram of an example process for providing foveated sensor readout according to aspects of the subject technology.

FIG. 18 illustrates an example process 1800 for foveated sensor readout, in accordance with one or more implementations. For explanatory purposes, the process 1800 is primarily described herein with reference to the electronic device 105 of FIG. 1. However, the process 1800 is not limited to the electronic device 105 of FIG. 1, and one or more blocks (or operations) of the process 1800 may be performed by one or more other components of other suitable devices. Further for explanatory purposes, some of the blocks of the process 1800 are described herein as occurring in serial, or linearly. However, multiple blocks of the process 1800 may occur in parallel. In addition, the blocks of the process 1800 need not be performed in the order shown and/or one or more blocks of the process 1800 need not be performed and/or can be replaced by other operations.

In the example of FIG. 18, at block 1802, sensor information (e.g., charges or other electrical quantities or signals that form sensor pixel values) may be captured with a plurality of sensor pixels (e.g., sensor pixels 600) in an array (e.g., array 504) of sensor pixels. For example, capturing sensor information may include accumulating charge in the sensor pixels responsive to light impinging on the photodiodes of the sensor pixels (e.g., between resets of the sensor pixels).

At block 1804, the sensor information of at least a first sensor pixel and a second sensor pixel of the plurality the sensor pixels may be binned (e.g., combined, such as averaged or summed), within the array of sensor pixels prior to readout of the sensor pixels and based on a region-of-interest (ROI) indicator (e.g., a gaze location, such as gaze location 200) of a user in a field-of-view of the array of sensor pixels (e.g., a field-of-view that is projected, such as by one or more lenses, onto the array). In one or more implementations, the first sensor pixel and the second sensor pixel are disposed in a row (e.g., a row 606) of the array of sensor pixels. In one or more other implementations, the first sensor pixel and the second sensor pixel are disposed in a column (e.g., a column 608) of the array of sensor pixels. In one or more implementations, the first sensor pixel may include a first color filter (e.g., a color filter element 710A, 710B, 710C, 710D, 810A, 810B, 810C, 810D, 910A, 910B, 910C, 910D, or 912) of a first color (e.g., red, green, blue, or another color), and the second sensor pixel may include a second color filter (e.g., another of the color filter elements 710A, 710B, 710C, 710D, 810A, 810B, 810C, 810D, 910A, 910B, 910C, 910D, or 912) of the first color. In one or more other implementations, the first sensor pixel and/or the second sensor pixel may be monochrome sensor pixels having color filter elements without any color, or being free of color filter elements.

At block 1806, a single binned value for the first sensor pixel and the second sensor pixel (e.g., sensor pixels in the region 1008), and an individual pixel value for at least a third sensor pixel (e.g., in the region 1006) of the array of sensor pixels, may be read out (e.g., by ADC circuitry 604) from the array of sensor pixels (e.g., in a readout operation 1000) for a single image frame (e.g., for a single foveated image frame 300).

In one or more implementations, the array of sensor pixels may be disposed on an image sensor (e.g., image sensor 502) that is disposed in an electronic device (e.g., electronic device 105), and the process 1800 may also include obtaining the ROI indicator (e.g., gaze location) using another sensor (e.g., using one or more other image sensors and/or cameras 150) of the electronic device, and identifying, based on the ROI indicator, a binning region of interest (e.g., region 1008, 1102, 1104, 1108, or 1202) that includes the first sensor pixel and the second sensor pixel.

In one or more implementations, binning, within the array of sensor pixels prior to readout of the sensor pixels and based on the ROI indicator in the field-of-view of the array of sensor pixels, the sensor information of at least the first sensor pixel and the second sensor pixel of plurality the sensor pixels may include combining the sensor information of at least the first sensor pixel and the second sensor pixel of plurality the sensor pixels in a single floating diffusion region (e.g., floating diffusion region 702, 802, or 902) within the array of sensor pixels. Reading out the single binned value for the first sensor pixel and the second sensor pixel may include reading out the combined sensor information from the single floating diffusion region (e.g., along a data line 610A, 610C, or 610E). In this example, the process 1800 may also include binning, within the array of sensor pixels prior to readout of the sensor pixels and based on the ROI indicator in the field-of-view of the array of sensor pixels, the sensor information of at least a fourth sensor pixel (e.g., having sensor element 700C or 800C) and a fifth sensor pixel (e.g., having sensor element 700D or 800D), such as additional pixels in the region 1008 for which the resolution is reduced, by shorting together a sensor element (e.g., sensor element 700C or 800C) of the fourth sensor pixel with a sensor element (e.g., sensor element 700D or 800D) of the fifth sensor pixel.

In one or more implementations, binning, within the array of sensor pixels prior to readout of the sensor pixels and based on the ROI indicator in the field-of-view of the array of sensor pixels, the sensor information of at least the first sensor pixel and the second sensor pixel of plurality the sensor pixels may include shorting together a first sensor element (e.g., sensor element 700C or 800C) of the first sensor pixel with a second sensor element (e.g., sensor element 700D or 800D) of the second sensor pixel, and reading out the single binned value may include reading out the single binned value along a data line (e.g., data line 610B or 610D) coupled to the shorted first sensor element and second sensor element.

In one or more implementations, the array of sensor pixels is disposed on an image sensor, and the process 1800 may also include binning, within the array of sensor pixels prior to readout of the sensor pixels and based on the ROI indicator in the field-of-view of the array of sensor pixels, the sensor information of at least a fourth sensor pixel and a fifth sensor pixel to generate an other single binned value for the fourth sensor pixel and the fifth sensor pixel; and binning, within the array of sensor pixels and prior to conversion of the single binned pixel value or the other single binned pixel value into digital values, the single binned pixel value and the other single binned value to generate a further binned pixel value. In one or more implementations, the array of sensor pixels may be disposed on an image sensor (e.g., image sensor 502), and the process 1800 may also include binning, within the array of sensor pixels prior to readout of the sensor pixels and based on the ROI indicator in the field-of-view of the array of sensor pixels, the sensor information of at least a fourth sensor pixel (e.g., having sensor element 700C or 800C) and a fifth sensor pixel (e.g., having sensor element 700D or 800D), such as additional pixels in the region 1008 for which the resolution is reduced by binning; reading out, from the array of sensor pixels, another single binned value for the fourth sensor pixel and the fifth sensor pixel; and binning, by readout circuitry (e.g., readout circuitry 506, such as ADC circuitry 604) that is on the image sensor and external to the array of sensor pixels, the single binned value and the other single binned value to generate a further binned pixel value (e.g., as discussed herein in connection with FIGS. 15-17). The process 1800 may also include converting the further binned pixel value to a digital binned pixel value by the readout circuitry (e.g., by ADC circuitry 604); providing, in a sensor output corresponding to the single image frame from the readout circuitry that is on the image sensor to processing circuitry (e.g., processor 510) external to the image sensor, the individual pixel value and the digital binned pixel value (e.g., in a sensor output 1002); and digitally binning, by the processing circuitry, the digital binned pixel value and one or more additional digital binned pixel values received from the readout circuitry in the image single frame.

In one or more implementations, the process 1800 may also include converting (e.g., by ADC circuitry 604) the single binned value for the first sensor pixel and the second sensor pixel to a digital binned pixel value; converting (e.g., by ADC circuitry 604) the individual pixel value to a digital individual pixel value; and providing, to processing circuitry (e.g., processor 510) external to an image sensor (e.g., image sensor 502) including the array of sensor pixels, a sensor output (e.g., a digitized version of the binned analog readout 1106) corresponding to the single image frame including the digital binned pixel value and the digital individual pixel value, the sensor output having a uniform resolution in a horizontal direction and a vertical direction across the sensor output (e.g., as discussed herein in connection with FIG. 11).

In one or more implementations, the process 1800 may also include converting (e.g., by ADC circuitry 604) the single binned value for the first sensor pixel and the second sensor pixel to a digital binned pixel value; converting (e.g., by ADC circuitry 604) the individual pixel value to a digital individual pixel value; and providing, to processing circuitry (e.g., processor 510) external to an image sensor (e.g., image sensor 502) including the array of sensor pixels, a sensor output (e.g., a digitized version of the binned analog readout 1204, or the sensor output 1002) corresponding to the single image frame including the digital binned pixel value and the digital individual pixel value, the sensor output having a non-uniform resolution in at least one of a horizontal direction and a vertical direction across the sensor output (e.g., as discussed herein in connection with FIG. 2).

Figure 19:
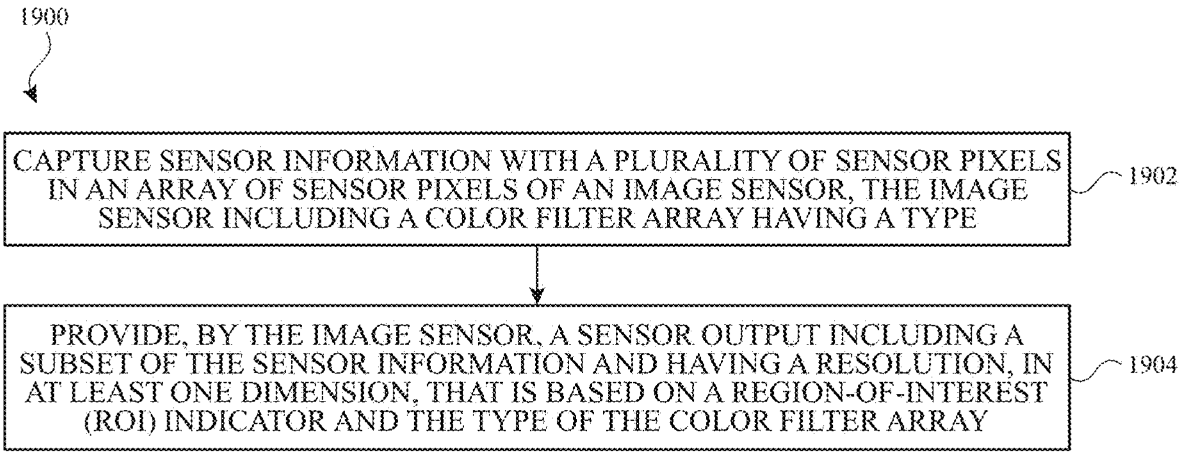
FIG. 19 illustrates a flow diagram of another example process for providing foveated sensor readout according to aspects of the subject technology.

FIG. 19 illustrates another example process 1900 for foveated sensor readout, in accordance with one or more implementations. For explanatory purposes, the process 1900 is primarily described herein with reference to the electronic device 105 of FIG. 1. However, the process 1900 is not limited to the electronic device 105 of FIG. 1, and one or more blocks (or operations) of the process 1900 may be performed by one or more other components of other suitable devices. Further for explanatory purposes, some of the blocks of the process 1900 are described herein as occurring in serial, or linearly. However, multiple blocks of the process 1900 may occur in parallel. In addition, the blocks of the process 1900 need not be performed in the order shown and/or one or more blocks of the process 1900 need not be performed and/or can be replaced by other operations.

In the example of FIG. 19, at block 1902, sensor information (e.g., charges or other electrical quantities or signals that form sensor pixel values) may be captured with a plurality of sensor pixels (e.g., sensor pixels 600) in an array (e.g., array 504) of sensor pixels of an image sensor (e.g., image sensor 502). The image sensor may include a color filter array having a type, such as a Bayer type (e.g., 1×1), Quad type (e.g., 2×2), or other CFA type (e.g., 3×3 or 4×4) in some examples).

At block 1904, the image sensor may provide a sensor output (e.g., the sensor output 1002, a digitized version of the binned analog readout 1106, or a digitized version of the binned analog readout 1204) including a subset of the sensor information and having a resolution, in at least one dimension, that is based on a region-of-interest (ROI) indicator (e.g., gaze location of a user) and the type of the color filter array (e.g., as discussed herein in connection with FIGS. 11-17). For example, the ROI indicator may determine which of the sensor pixels correspond to a high resolution portion of an image frame and which sensor pixels correspond to one or more lower resolution portions of the image frame. The type of the color filter array may determine which of the sensor pixels that correspond to one or more lower resolution portions of the image frame can be binned within the pixel array prior to readout.

For example, the color filter array (CFA) may include multiple different color filters (e.g., red, green, and blue color filter elements) for multiple respective sub-pixels of each sensor pixel, and the resolution may include a uniform resolution in a horizontal dimension and a vertical dimension across the sensor output (e.g., as discussed herein in connection with FIGS. 11, 13, and 15). As another example, the color filter array may include multiple color filters of the same color (e.g., multiple red color filter elements, multiple green color filter elements, or multiple blue color filter elements) for multiple respective sub-pixels of each sensor pixel, and the resolution may include a non-uniform resolution along at least one column of the sensor output (e.g., as discussed herein in connection with FIGS. 12, 14, 16, and 17). As another example, the color filter array may include monochrome (e.g., colorless) color filters or an image sensor may be provided without a color filter array.

In one or more implementations, the process 1900 may also include, prior to providing the sensor output, reading out (e.g., by readout circuitry 506, such as ADC circuitry 604), from the array of sensor pixels and based on the ROI indicator, the sensor information of a subset of the plurality of sensor pixels. For example, the type of the color filter array may be a Bayer type (e.g., having 2×2 groups of red, green, and blue color filter elements), and reading out the subset of the sensor pixels may include binning a color sub-pixel (e.g., having a sensor element 700A, 700C, 800A, or 800C), having a first color (e.g., a color filter element 710A, 710C, 810A, or 810C), of one sensor pixel with a color sub-pixel (e.g., having a sensor element 700B, 700D, 800B, or 800D), having the first color, of another sensor pixel (e.g., another sensor pixel in another row or another column). As another example, the type of the color filter array may be a Quad Bayer type (e.g., having 2×2 groups of color filter elements of the same color), and reading out the subset of the sensor pixels may include binning a first color sub-pixel (e.g., including one of the sensor elements 900A, 900B, 900C, or 900D), having a first color, of one sensor pixel with a second color sub-pixel (e.g., including another one of the sensor elements 900A, 900B, 900C, or 900D), having the first color, of the one sensor pixel. As other examples, the type of the color filter array may be a 3×3 type CFA (e.g., having 3×3 groups of color filter elements of the same color), 4×4 type CFA (e.g., having 4×4 groups of color filter elements of the same color), or any other (e.g., N×N) arrangement of color filter elements. As yet another example, the image sensor may be a monochrome image sensor that includes color filter elements only of a single color, or that is free of color filter elements.

As described above, aspects of the subject technology may include the collection and transfer of data. The present disclosure contemplates that in some instances, this collected data may include personal information data that uniquely identifies or can be used to identify a specific person. Such personal information data can include images, sensor data, gaze information, head position and/or characteristic information, motion information, environment information, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in foveated sensor readout. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of foveated sensor readout, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 20:
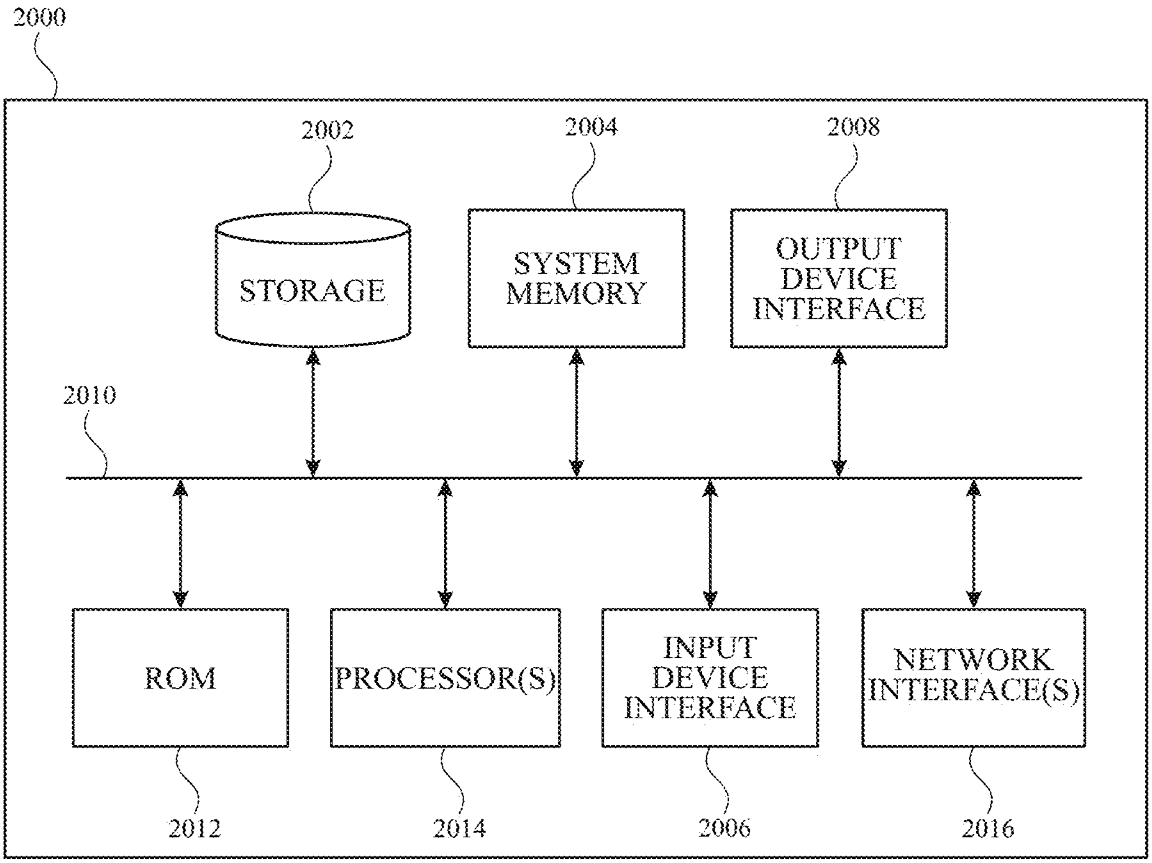
FIG. 20 illustrates an example computing device with which aspects of the subject technology may be implemented.

FIG. 20 illustrates an example computing device with which aspects of the subject technology may be implemented in accordance with one or more implementations. The computing device 2000 can be, and/or can be a part of, any computing device or server for generating the features and processes described above, including but not limited to a laptop computer, a smartphone, a tablet device, a wearable device such as a goggles or glasses, and the like. The computing device 2000 may include various types of computer readable media and interfaces for various other types of computer readable media. The computing device 2000 includes a permanent storage device 2002, a system memory 2004 (and/or buffer), an input device interface 2006, an output device interface 2008, a bus 2010, a ROM 2012, one or more processing unit(s) 2014, one or more network interface(s) 2016, and/or subsets and variations thereof.

The bus 2010 collectively represents all system, peripheral, and chipset buses that communicatively connect the numerous internal devices of the computing device 2000. In one or more implementations, the bus 2010 communicatively connects the one or more processing unit(s) 2014 with the ROM 2012, the system memory 2004, and the permanent storage device 2002. From these various memory units, the one or more processing unit(s) 2014 retrieves instructions to execute and data to process in order to execute the processes of the subject disclosure. The one or more processing unit(s) 2014 can be a single processor or a multi-core processor in different implementations.

The ROM 2012 stores static data and instructions that are needed by the one or more processing unit(s) 2014 and other modules of the computing device 2000. The permanent storage device 2002, on the other hand, may be a read-and-write memory device. The permanent storage device 2002 may be a non-volatile memory unit that stores instructions and data even when the computing device 2000 is off. In one or more implementations, a mass-storage device (such as a magnetic or optical disk and its corresponding disk drive) may be used as the permanent storage device 2002.

In one or more implementations, a removable storage device (such as a floppy disk, flash drive, and its corresponding disk drive) may be used as the permanent storage device 2002. Like the permanent storage device 2002, the system memory 2004 may be a read-and-write memory device. However, unlike the permanent storage device 2002, the system memory 2004 may be a volatile read-and-write memory, such as random access memory. The system memory 2004 may store any of the instructions and data that one or more processing unit(s) 2014 may need at runtime. In one or more implementations, the processes of the subject disclosure are stored in the system memory 2004, the permanent storage device 2002, and/or the ROM 2012. From these various memory units, the one or more processing unit(s) 2014 retrieves instructions to execute and data to process in order to execute the processes of one or more implementations.

The bus 2010 also connects to the input and output device interfaces 2006 and 2008. The input device interface 2006 enables a user to communicate information and select commands to the computing device 2000. Input devices that may be used with the input device interface 2006 may include, for example, alphanumeric keyboards and pointing devices (also called "cursor control devices"). The output device interface 2008 may enable, for example, the display of images generated by computing device 2000. Output devices that may be used with the output device interface 2008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 20, the bus 2010 also couples the computing device 2000 to one or more networks and/or to one or more network nodes through the one or more network interface(s) 2016. In this manner, the computing device 2000 can be a part of a network of computers (such as a LAN, a wide area network ("WAN"), or an Intranet, or a network of networks, such as the Internet. Any or all components of the computing device 2000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

capturing sensor information with a plurality of sensor pixels in an array of sensor pixels having a corresponding array of color filters;

binning, within the array of sensor pixels prior to readout of the sensor pixels and based on a region-of-interest (ROI) indicator in a field-of-view of the array of sensor pixels, the sensor information of at least a first sensor pixel and a second sensor pixel of the plurality of sensor pixels; and reading out, from the array of sensor pixels for a single image frame and based on a type of the array of color filters, a non-uniform binned analog readout having a non-uniform resolution in at least one dimension across the readout, the non-uniform binned analog readout comprising:

a single binned value for the first sensor pixel and the second sensor pixel; and an individual pixel value for at least a third sensor pixel of the array of sensor pixels.

2. The method of claim 1, wherein the array of sensor pixels is disposed on an image sensor that is disposed in an electronic device, and wherein the method further comprises:

obtaining the ROI indicator using another sensor of the electronic device; and identifying, based on the ROI indicator, a binning region of interest that includes the first sensor pixel and the second sensor pixel.

3. The method of claim 1, wherein:

binning, within the array of sensor pixels prior to readout of the non-uniform binned analog readout and based on the ROI indicator in the field-of-view of the array of sensor pixels, the sensor information of at least the first sensor pixel and the second sensor pixel of the plurality of sensor pixels comprises combining the sensor information of at least the first sensor pixel and the second sensor pixel of the plurality of sensor pixels in a single floating diffusion region within the array of sensor pixels, and the method further comprises reading out the single binned value for the first sensor pixel and the second sensor pixel by reading out the combined sensor information from the single floating diffusion region.

4. The method of claim 3, further comprising:

binning, within the array of sensor pixels prior to readout of the non-uniform binned analog readout and based on the ROI indicator in the field-of-view of the array of sensor pixels, the sensor information of at least a fourth sensor pixel and a fifth sensor pixel by shorting together a sensor element of the fourth sensor pixel with a sensor element of the fifth sensor pixel.

5. The method of claim 1, wherein:

binning, within the array of sensor pixels prior to readout of the sensor pixels and based on the ROI indicator in the field-of-view of the array of sensor pixels, the sensor information of at least the first sensor pixel and the second sensor pixel of the plurality of sensor pixels comprises shorting together a first sensor element of the first sensor pixel with a second sensor element of the second sensor pixel, and the method further comprises reading out the single binned value for the first sensor pixel and the second sensor pixel by reading out the single binned value along a data line coupled to the shorted first sensor element and second sensor element.

6. The method of claim 1, wherein the first sensor pixel and the second sensor pixel are both disposed in a row of the array of sensor pixels or both disposed in a column of the array of sensor pixels.

7. The method of claim 1, wherein the array of is disposed on an image sensor, the method further comprising:

binning, within the array of sensor pixels prior to readout of the sensor pixels non-uniform binned analog readout and based on the ROI indicator in the field-of-view of the array of sensor pixels, the sensor information of at least a fourth sensor pixel and a fifth sensor pixel to generate an other single binned value for the fourth sensor pixel and the fifth sensor pixel; and binning, within the array of sensor pixels and prior to conversion of the single binned value or the other single binned value into digital values, the single binned value and the other single binned value to generate a further binned pixel value.

8. The method of claim 1, wherein the array of sensor pixels is disposed on an image sensor, the method further comprising:

binning, within the array of sensor pixels prior to readout of the non-uniform binned analog readout and based on the ROI indicator in the field-of-view of the array of sensor pixels, the sensor information of at least a fourth sensor pixel and a fifth sensor pixel;

including, in the non-uniform binned analog readout, an other single binned value for the fourth sensor pixel and the fifth sensor pixel; and binning, by readout circuitry that is on the image sensor and external to the array of sensor pixels, the single binned value and the other single binned value to generate a further binned pixel value.

9. The method of claim 8, further comprising:

converting the further binned pixel value to a digital binned pixel value by the readout circuitry; and digitally binning, by processing circuitry external to the image sensor, the digital binned pixel value and one or more additional digital binned pixel values received from the readout circuitry in the non-uniform binned analog readout.

10. The method of claim 1, wherein the first sensor pixel comprises a first color filter of a first color, and the second sensor pixel comprises a second color filter of the first color.

11. The method of claim 1, further comprising:

converting the non-uniform binned analog readout into a non-uniform binned digital readout at least in part by:

converting the single binned value for the first sensor pixel and the second sensor pixel to a digital binned pixel value; and converting the individual pixel value to a digital individual pixel value; performing a digital binning operation on the non-uniform binned digital readout to generate a sensor output of an image sensor; and providing, to processing circuitry external to the image sensor comprising the array of sensor pixels, the sensor output having a uniform resolution in a horizontal direction and a vertical direction across the sensor output.

12. The method of claim 1, further comprising:

converting the single binned value for the first sensor pixel and the second sensor pixel to a digital binned pixel value;

converting the individual pixel value to a digital individual pixel value; and providing, to processing circuitry external to an image sensor comprising the array of sensor pixels, a sensor output corresponding to a non-uniform binned digital readout single image frame, the sensor output including the digital binned pixel value and the digital individual pixel value, the sensor output having the non-uniform resolution in at least one of a horizontal direction and a vertical direction across the sensor output.

13. The method of claim 1, wherein the non-uniform binned analog readout includes a first column with a first number of analog pixel values and a second column with a second number, different from the first number, of analog pixel values, and wherein the first column comprises:

the single binned value for the first sensor pixel and the second sensor pixel; and the individual pixel value for at least the third sensor pixel of the array of sensor pixels.

14. The method of claim 13, wherein the non-uniform binned analog readout further includes a first row with a third number of analog pixel values and a second row with a fourth number, different from the third number, of analog pixel values.

15. A method, comprising:

capturing sensor information with a plurality of sensor pixels in an array of sensor pixels of an image sensor, wherein the image sensor comprises a color filter array having a type; and providing, by the image sensor, a sensor output including a subset of the sensor information and having a resolution, in at least one dimension, that is based on a region-of-interest (ROI) indicator and the type of the color filter array, wherein the color filter array comprises multiple color filters of the same color for multiple respective sub-pixels of each sensor pixel, and wherein the resolution comprises a non-uniform resolution along at least one column of the sensor output.

16. The method of claim 15, further comprising, prior to providing the sensor output, reading out, from the array of sensor pixels and based on the ROI indicator, the sensor information of a subset of the plurality of sensor pixels.

17. The method of claim 16, wherein the type of the color filter array comprises a Quad Bayer type, and wherein reading out the subset of the sensor pixels comprises binning a first color sub-pixel, having a first color, of one sensor pixel with a second color sub- pixel, having the first color, of the one sensor pixel.

18. A device, comprising:

an image sensor comprising a plurality of sensor pixels in an array of sensor pixels having a corresponding array of color filters, the image sensor configured to:

capture sensor information with the plurality of sensor pixels in the array of sensor pixels;

bin, within the array of sensor pixels prior to readout of the sensor pixels and based on a region-of-interest (ROI) indicator in a field-of-view of the array of sensor pixels, the sensor information of at least a first sensor pixel and a second sensor pixel of the plurality of sensor pixels; and read out, from the array of sensor pixels for a single image frame and based on a type of the array of color filters, a non-uniform binned analog readout having a non-uniform resolution in at least one dimension across the readout, the non-uniform binned analog readout comprising:

a single binned value for the first sensor pixel and the second sensor pixel; and an individual pixel value for at least a third sensor pixel of the array of sensor pixels.

19. The device of claim 18, wherein the image sensor further comprises analog-to-digital conversion circuitry, the analog-to-digital conversion circuitry configured to:

convert the single binned value for the first sensor pixel and the second sensor pixel to a digital binned pixel value;

convert the individual pixel value to a digital individual pixel value; and provide, to processing circuitry external to the image sensor, a sensor output corresponding to a non-uniform binned digital readout including the digital binned pixel value and the digital individual pixel value, the sensor output having a resolution, in the at least one dimension, that is based on the ROI indicator and the type of the array of color filters.

20. The device of claim 18, wherein the non-uniform binned analog readout includes a first column with a first number of analog pixel values and a second column with a second number, different from the first number, of analog pixel values, and wherein the first column comprises:

the single binned value for the first sensor pixel and the second sensor pixel; and the individual pixel value for at least the third sensor pixel of the array of sensor pixels.

* * * * *